United States Patent
Fujishiro

(10) Patent No.: US 10,073,270 B2
(45) Date of Patent: Sep. 11, 2018

(54) IMAGE DISPLAY APPARATUS

(71) Applicant: SEIKO EPSON CORPORATION, Tokyo (JP)

(72) Inventor: Takeshi Fujishiro, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 32 days.

(21) Appl. No.: 14/939,347

(22) Filed: Nov. 12, 2015

(65) Prior Publication Data

US 2016/0147071 A1    May 26, 2016

(30) Foreign Application Priority Data

Nov. 21, 2014    (JP) .................................. 2014-236701
Jun. 19, 2015    (JP) .................................. 2015-123641

(51) Int. Cl.
| | |
|---|---|
| G02B 27/01 | (2006.01) |
| H04N 13/02 | (2006.01) |
| G02C 3/02 | (2006.01) |
| H04N 13/04 | (2006.01) |

(52) U.S. Cl.
CPC ..... *G02B 27/0176* (2013.01); *G02B 27/0172* (2013.01); *G02C 3/02* (2013.01); *H04N 13/0239* (2013.01); *H04N 13/044* (2013.01); *G02B 2027/014* (2013.01); *G02B 2027/0132* (2013.01); *G02B 2027/0138* (2013.01); *G02B 2027/0152* (2013.01); *G02B 2027/0154* (2013.01); *G02B 2027/0159* (2013.01); *G02B 2027/0178* (2013.01)

(58) Field of Classification Search
None
See application file for complete search history.

(56) References Cited

U.S. PATENT DOCUMENTS

| | | | |
|---|---|---|---|
| 5,486,841 A | | 1/1996 | Hara et al. |
| 5,844,530 A | * | 12/1998 | Tosaki .................. G02B 27/017 345/7 |
| 5,954,642 A | | 9/1999 | Johnson et al. |
| 2005/0083579 A1 | | 4/2005 | Volkenandt et al. |

(Continued)

FOREIGN PATENT DOCUMENTS

| | | |
|---|---|---|
| JP | H06-123852 A | 5/1994 |
| JP | H10-240159 A | 9/1998 |

(Continued)

OTHER PUBLICATIONS

Aug. 9, 2016 Extended European Search Report issued in European Patent Application No. 15195249.6.

(Continued)

*Primary Examiner* — Nicholas J Lee
*Assistant Examiner* — Duane N Taylor, Jr.
(74) *Attorney, Agent, or Firm* — Oliff PLC

(57) ABSTRACT

An image display apparatus includes a frame along a head of an observer, a display unit that displays an image that can be visually recognized by the observer, and a supporting part attached to the frame and supporting the display unit, wherein the frame is fixed to a position in which the image displayed by the display unit connected to the frame via the supporting part is visually recognized by the observer.

18 Claims, 20 Drawing Sheets

(56) References Cited

U.S. PATENT DOCUMENTS

| | | | |
|---|---|---|---|
| 2006/0119539 A1* | 6/2006 | Kato | G02B 27/0176 345/8 |
| 2010/0141905 A1* | 6/2010 | Burke | G02B 27/017 353/85 |
| 2011/0050900 A1* | 3/2011 | Sato | G06Q 30/02 348/143 |
| 2013/0250135 A1* | 9/2013 | Blum | A61F 2/1627 348/211.99 |
| 2014/0340285 A1 | 11/2014 | Hiraide | |

FOREIGN PATENT DOCUMENTS

| | | |
|---|---|---|
| JP | 2000097637 A | 4/2000 |
| JP | 2012-105118 A | 5/2012 |
| JP | 2014-186201 A | 10/2014 |
| WO | 9414152 A1 | 6/1994 |
| WO | 01/27684 A2 | 4/2001 |

OTHER PUBLICATIONS

Anonymous: "3D Hero System: A System for Mounting a Stereo Camera to a Helmet," Apr. 4, 2011, XP055290958, Retrieved from the Internet: URL: http://www.gohd.cz/wp-content/uploads/2014/09/1-3D-UM-ENG-011711.pdf [retrieved on Jul. 25, 2016].

Anonymous: "GoPro—Head Strap + QuickClip—Wear your GoPro on your head," Oct. 17, 2014, XP055291019, Retrieved from the Internet: URL:http://web.archive.org/web/20141017030644/http://shop.gopro.com/mounts/head-strap-plus-quickclip/ACHOM-001.html [retrieved on Jul. 26, 2016].

Anonymous: "Vision Quest for the Legally Blind | Transparency," Oct. 31, 2014, XP055291288, Retrieved from the Internet: URL:http://www.epson.com/community/transparency/2014/10/31/vision-quest-for-the-legally-blind-2/ [retrieved on Jul. 26, 2016].

Anonymous: "Seeing the light: smart glasses help boost sight of visually impaired," | South China Morning Post, Sep. 2, 2014, XP055291298, Retrieved from the Internet: URL:http://www.scmp.com/news/world/article/1583204/seeing-light-smart-glasses-help-boost-sight-visually-impaired [retrieved on Jul. 26, 2016].

Anonymous:"PT-01 Head mounted display user manual," Dec. 31, 1994, XP055291300, Retrieved from the Internet: URL:http://vrtifacts.com/wp-content/uploads/2010/04/PT-01_Manual.pdf [retrieved on Jul. 26, 2016].

Anonymous: "Photos of the Optics1 PT-01 Head mounted display," Dec. 31, 1994, XP055291311, Retrieved from the Internet: URL:http://www.befr.ebay.be/itm/OPTICS1-INC-PT-01-Head-Mounted-Display-/171973454105 [retrieved on Jul. 26, 2016].

Little: "Evolution of the Smart Glasses | Product Design & 3D Printing London Based Consultancy—LUMA Industrial Design," Feb. 28, 2015, XP055291399, Retrieved from the Internet: URL:http://www.luma-id.com/2015/02/28/smart-glasses/ [retrieved on Jul. 26, 2016].

Apr. 15, 2016 European Search Report issued in European Patent Application No. 15195249.6.

* cited by examiner

IMAGE DISPLAY APPARATUS

BACKGROUND

1. Technical Field

The present invention relates to an image display apparatus.

2. Related Art

In related art, virtual image display apparatuses including HMDs (Head Mounted Displays) worn on heads of observers have been known (for example, see Patent Document 1 (JP-A-2014-186201)).

The virtual image display apparatus disclosed in Patent Document 1 is formed as a see-through HMD including a first image forming main body unit and a second image forming main body unit respectively provided on right and left of the observer, and light guiding members that respectively guide image lights formed by these image forming main body units to the right eye and the left eye of the observer. Further, the virtual image display apparatus includes a frame part having a nose pad member to be in contact with the nose of the observer, and temple portions to be in contact with the temple areas of the observer. The virtual image display apparatus is worn so that the respective light guiding members may be placed in front of the eyes of the observer by placing the respective temple portions in positions corresponding to the right and left temples and bringing the nose pad member into contact with the nose.

Here, in the virtual image display apparatus disclosed in Patent Document 1, the apparatus is attached to the head of the observer with the nose part member in contact with the nose of the observer, and thereby, the load of the virtual image display apparatus is applied to the nose. Accordingly, when the virtual image display apparatus is used over a long period of time, there is a problem that the load on the nose increases and the feeling of use becomes worse.

SUMMARY

An advantage of some aspects of the invention is to provide an image display apparatus that may reduce load on an observer in wearing.

An image display apparatus according to a first aspect of the invention includes a frame along a head of an observer, a display unit that displays an image that can be visually recognized by the observer, and a supporting part attached to the frame and supporting the display unit, wherein the frame is fixed to a position in which the image displayed by the display unit connected to the frame via the supporting part is visually recognized by the observer.

Note that, as a fixed part of the frame, the forehead part, the temporal part, the back of the head, and the top of the head in the head of a user may be exemplified. In addition, when the user wears a hard hat, a cap, or the like, the positions corresponding to the forehead part, the temporal part, the back of the head, and the top of the head in the hard hat, the cap, or the like may be exemplified. Namely, as long as the frame is fixed to the position corresponding to the head of the observer (specifically, the part upper than the outer circumferential line of the head passing the eyebrows and ears), the configuration of the hard hat, the cap, or the like may intervene between the head and the main body part. As described above, the frame is fixed to the upper part from the forehead part of the observer. In this case, the image display apparatus may be called a head mounted display apparatus.

According to the first aspect, the frame along the head of the user is fixed to the position in which the image displayed by the display unit connected to the frame via the supporting part can be visually recognized by the observer. According to the configuration, the frame is placed along the head and fixed, and thereby, load of the image display apparatus on the nose of the observer may be suppressed. Therefore, the load on the observer when the image display apparatus is worn may be reduced and the feeling of use (feeling of wearing) may be improved.

In the first aspect, it is preferable that the supporting part is adapted to be rotatable around a connecting portion to the frame.

According to the first aspect with this configuration, the supporting part is rotated, and thereby, the position and the angle of the display unit with respect to the frame may be adjusted. According to the configuration, the display unit is located in the position in response to the line of sight of the observer in wearing, and thereby, visual recognition of the image displayed by the display unit may be improved. Further, when the image is not visually recognized, the display unit may be removed from the front of the eye of the observer. Therefore, the convenience of the image display apparatus may be improved.

In the first aspect, it is preferable that the supporting part is connected to the frame rotatably around a rotation shaft nearly orthogonal to a visual direction when the observer visually recognizes the image.

According to the first aspect with this configuration, the position of the display unit may be easily adjusted by the rotation operation with respect to the supporting part, and, when the image is not visually recognized, the display unit may be reliably removed from the front of the eye of the observer. Therefore, the convenience of the image display apparatus may be reliably improved.

In the first aspect, it is preferable that the display unit is placed in a position corresponding to an eye of the observer, and the supporting part connects a position corresponding to a temple of the observer in the frame and the display unit.

According to the first aspect with this configuration, the supporting part extends from the position corresponding to the temple of the observer in the frame and is connected to the display unit. According to the configuration, when the image display apparatus is worn, the contact of the supporting part with the ear of the observer may be suppressed. Therefore, the feeling of wearing of the image display apparatus may be further improved.

In the first aspect, it is preferable that the supporting part has a plurality of arms with one ends respectively connected to a portion at one end and a part at the other end of the frame in horizontal directions for the observer and the other ends connected to the display unit.

According to the first aspect with this configuration, the display unit is supported by the plurality of arms forming the supporting part, and the display unit may be stably supported. Therefore, wobble of the display unit may be suppressed.

In the first aspect, it is preferable that a movement mechanism that allows the display unit to be movable in directions closer to or away from the frame is provided.

According to the first aspect with this configuration, the position of the display unit may be adjusted to be superimposed on the visual direction in response to the position of the eye of the observer. Therefore, the position of the display unit may be adjusted according to the observer, and the convenience and the versatility of the image display apparatus may be improved.

In the first aspect, it is preferable that an imaging unit provided in the frame and imaging at least a partial region in a field of view of the observer is provided.

According to the first aspect with this configuration, for example, a captured image by the imaging unit is displayed by the display unit and the captured image is output to the outside, and thereby, the surroundings of the observer may be grasped by the observer or others.

Here, when the imaging unit is located in the display unit, it is considered that the weight balance of the image display apparatus is lost due to the load of the imaging unit. On the other hand, the imaging unit is provided in the frame placed along the head of the observer, and thereby, the weight of the display unit may be reduced and the right weight balance of the image display apparatus may be easily achieved. Therefore, the load on the observer may be further reduced.

In the first aspect, it is preferable that the frame has an adjustment mechanism that adjusts an imaging direction of the imaging unit.

According to the first aspect with this configuration, the imaging direction of the imaging unit may be adjusted to the position in response to the visual direction of the observer. Therefore, at least a partial region in the field of view of the observer may be reliably imaged by the imaging unit.

In the first aspect, it is preferable that a control unit is provided within the frame and controls at least part of functions of the image display apparatus.

According to the first aspect with this configuration, as is the case of the imaging unit, compared to the case where the control unit is provided in the display unit, the weight of the display unit may be reduced and the right weight balance of the image display apparatus may be easily achieved. Therefore, the load on the observer may be further reduced.

In the first aspect, it is preferable that a cable extending from the display unit and passing through the supporting part and the frame is provided.

As the cable, a cable for transmitting image information of the displayed image and control information for controlling the operation of the display unit to the display unit may be exemplified.

Here, if a cable is extended from the display unit directly to the outside, it is necessary to increase the strength of a casing forming the outer shape of the display unit in consideration of the movement of the cable. Further, there is a problem of a bad appearance if the cable extends from the display unit to the outside.

On the other hand, according to the first aspect with the configuration described above, the cable extending from the display unit passes through the supporting part and the frame, and thereby, it is not necessary to increase the strength of the casing of the display unit, and further, the appearance of the image display apparatus may be made better.

In the first aspect, it is preferable that the frame has an arc-like outer shape along the head of the observer.

According to the first aspect with this configuration, the frame may be easily disposed along the head, and thereby, the feeling of wearing of the image display apparatus may be improved, and further, the appearance of the image display apparatus in wearing may be made better.

In the first aspect, it is preferable that the display unit has a display part for left eye and a display part for right eye for visual recognition of the image in each of a left eye and a right eye of the observer.

According to the first aspect with this configuration, by the display part for left eye and the display part for right eye, the same images may be respectively visually recognized by the left eye and the right eye of the observer, and additionally, for example, respectively different images including parallax images may be visually recognized. Therefore, the convenience and the versatility of the image display apparatus may be improved.

In the first aspect, it is preferable that the display unit has a light guiding member that guides a light forming the image to the eye of the observer and transmits outside light.

According to the first aspect with this configuration, the image and the part around the observer may be observed via the light guiding member. Accordingly, a sense of safety may be provided to the observer during visual recognition of the image and the image superimposed on the surrounding scenery is visually recognized by the observer, and thereby, augmented reality may be realized. Therefore, the convenience and the versatility of the image display apparatus may be further improved.

In the first aspect, it is preferable that, the image display apparatus is adapted such that, when the head is seen along a direction orthogonal to an axial direction of the head and a front-to-back direction of the head, the display unit can be placed so that a display surface on which the image is visually recognized may be nearly orthogonal to a line of sight inclined to a predetermined angle with respect to the axial direction and the front-to-back direction.

According to the first aspect with this configuration, the image display apparatus is adapted such that the display unit can be placed so that the display surface may be nearly orthogonal to the line of sight inclined to the predetermined angle with respect to the axial direction and the front-to-back direction, and thereby, the display unit may be placed in response to the line of sight of the observer.

Here, generally, a human is more comfortable to direct the line of sight to the lower side than an orthogonal direction with respect to the axial direction of the head than to direct the line of sight to the upper side including the orthogonal direction. Specifically, when the line of sight is directed to the upper side including the orthogonal direction, it is necessary to apply more tension to the extraocular muscle for changing the line of sight than that when the line of sight is directed to the lower side than the orthogonal direction, and fatigue of the extraocular muscle is easily caused. In other words, when the line of sight is slightly directed below the orthogonal direction, it is necessary to apply less tension to the extraocular muscle, and fatigue is less caused.

Accordingly, as described above, the image display apparatus is adapted such that the display unit can be placed, and thereby, even when the line of sight is directed downward, the image displayed by the display unit may be easily visually recognized. Therefore, in this case, the displayed image may be easily visually recognized in the direction of the line of sight under a relatively relaxed condition.

In the first aspect, it is preferable that the line of sight is inclined downward to nearly 10° with respect to the front-to-back direction.

Here, under a relaxed condition in an upright position, the line of sight is directed downward to nearly 10° with respect to the horizontal direction. Accordingly, the line of sight is inclined downward to nearly 10° with respect to the front-to-back direction and the display surface is nearly orthogonal to the line of sight, and thereby, the observer in the upright position may visually recognize the image under a relaxed condition. Therefore, the displayed image may be visually recognized more easily.

In the first aspect, it is preferable that the display unit has a light guiding member that guides a light forming the image to the eye of the observer and transmits outside light, a surface at the observer side and a surface at an opposite side to the observer in the light guiding member are respectively nearly in parallel to the display surface, and the surface at the observer side and the surface at the opposite side are respectively nearly orthogonal to the line of sight.

According to the first aspect with this configuration, the surface at the observer side and the surface at the opposite side in the light guiding member are placed to be nearly orthogonal to the line of sight, and thereby, the light guiding member may be easily placed so that the display surface may be nearly orthogonal to the line of sight. Therefore, the light guiding member may be easily placed in the position in which the image is easily visually recognized.

In the first aspect, it is preferable that a fixing part that fixes the frame in a position in which the image is visually recognized by the observer is provided.

As the fixing part, a belt-shaped member and a string-shaped member including a band surrounding the head may be exemplified, and further, a cap-shaped fixing part covering the head may be exemplified.

According to the first aspect with the configuration described above, the frame is fixed to the position by the fixing part, and thereby, the frame may be reliably fixed. Therefore, the feeling of wearing of the image display apparatus may be further improved.

An image display apparatus according to a second aspect of the invention includes a frame along a head of an observer, a display unit that displays an image that can be visually recognized by the observer, and a supporting part that supports the display unit and is adapted to be rotatable around a connecting portion to the frame, and can adjust a position of the display unit so that a display surface on which the image is visually recognized may be nearly orthogonal to a line of sight of the observer.

According to the second aspect, the position of the display unit may be adjusted so that the display surface may be nearly orthogonal to the line of sight of the observer by rotation of the supporting part, and thereby, the position of the display unit may be adjusted to the position in which the image is easily visually recognized in response to the line of sight of the observer. Therefore, visual recognition of the image may be improved. In addition, as described above, the display unit may be placed in response to the direction of the line of sight in which the observer may be relaxed, and thereby, the observer may reliably visually recognize the image under a relaxed condition.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
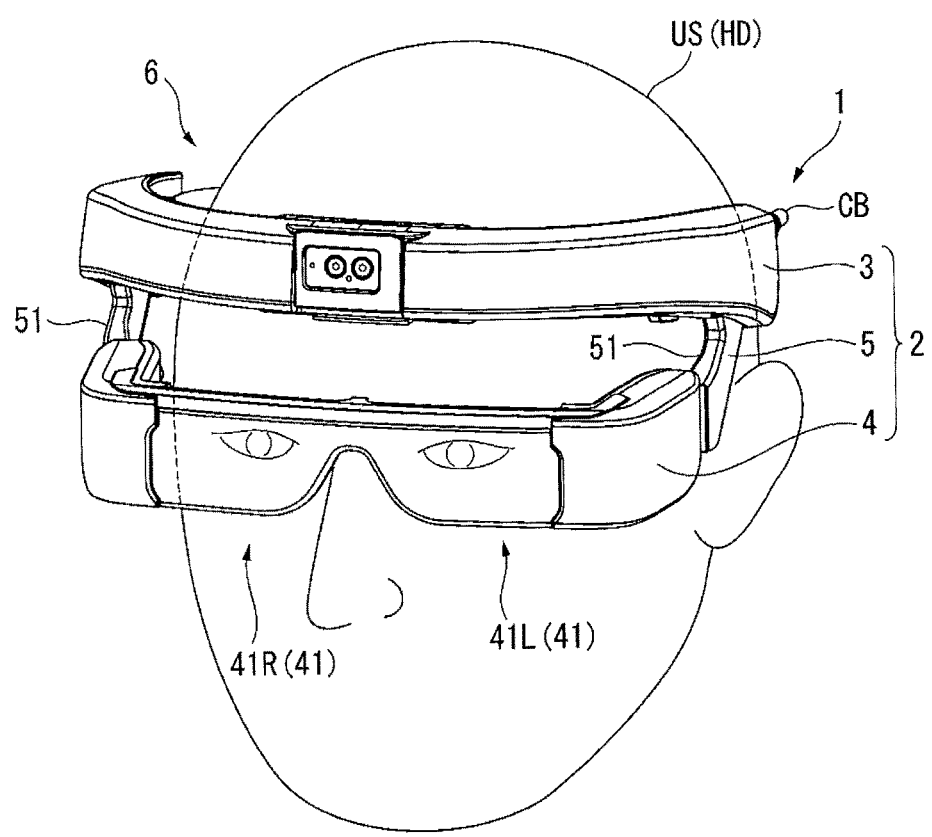
FIG. 1 is a perspective view showing a virtual image display apparatus according to the first embodiment of the invention.

As below, the first embodiment of the invention will be explained with reference to the drawings.
Schematic Configuration of Virtual Image Display Apparatus FIG. 1 is a perspective view showing a virtual image display apparatus 1 according to the embodiment attached to an observer.

The virtual image display apparatus 1 according to the embodiment corresponds to an image display apparatus according to the invention. As shown in FIG. 1, the virtual image display apparatus 1 is a head mounted display (HMD) attached to the head of an observer US (user), a hard hat, or the like, and specifically, a see-through HMD that displays a virtual image that can be visually recognized by the observer and enables the observer to observe an outside world by transmitting outside light.

The virtual image display apparatus 1 is fixed to the head HD in the position corresponding to the head HD (specifically, the part upper than the outer circumferential line of the head passing through the eyebrows and ears) of the observer US.

Figure 2:
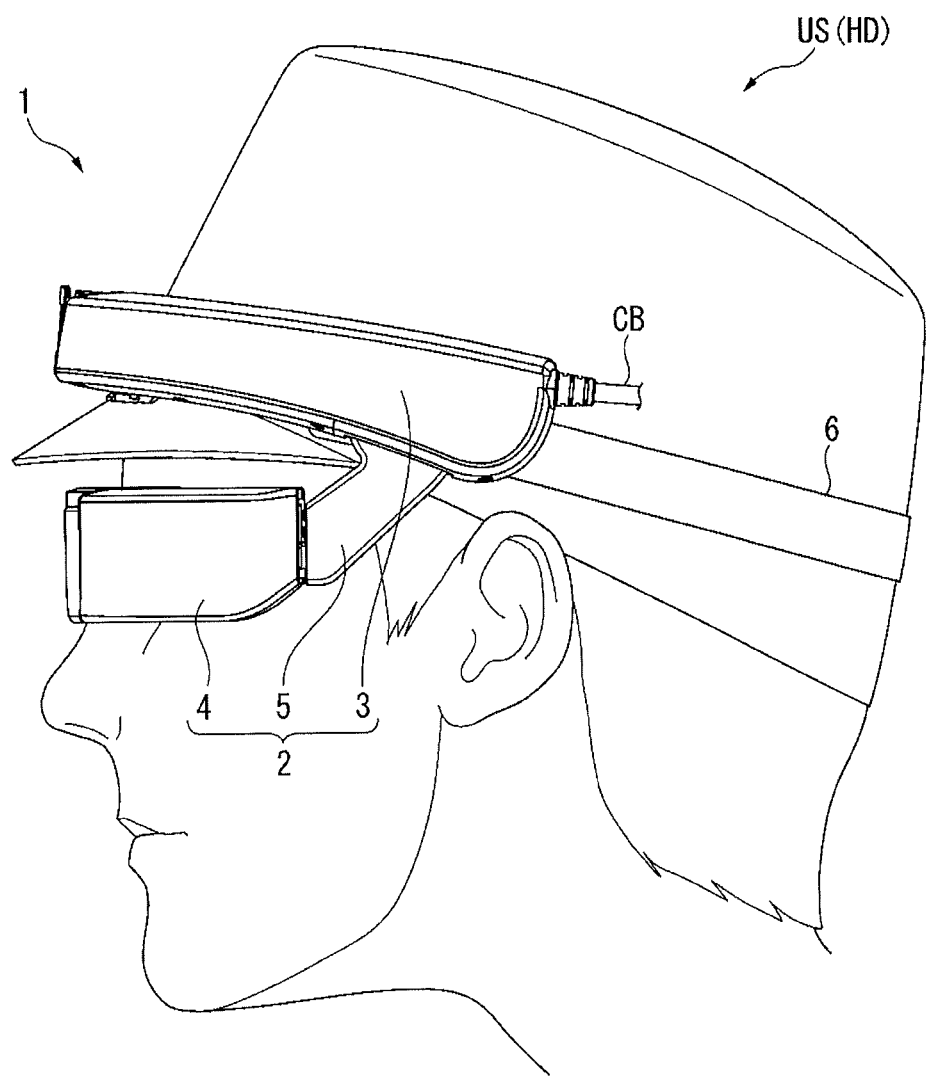
FIG. 2 is a side view showing the virtual image display apparatus attached to a user wearing a cap in the first embodiment.

FIG. 2 is a side view showing the virtual image display apparatus 1 attached to the head HD of the observer US wearing a cap CP.

As shown in FIG. 2, the virtual image display apparatus 1 can be attached indirectly to the head HD via the cap CP, a hard hat, or the like. Accordingly, in the following explanation, the head HD does not only directly refers to the head HD but also refers to the head HD wearing the cap CP, a hard hat, or the like.

In the following explanation, the Z-direction is a direction toward the outside of the head HD through the center between the eyes of the directions orthogonal to the axial direction of the head HD of the observer US wearing the virtual image display apparatus 1 (in other words, a visual direction when the observer faces the front). The X-direction and the Y-direction are directions respectively orthogonal to the Z-direction and orthogonal to each other. Of them, the Y-direction is a direction from the tin side to the top of the head side along the axial direction of the head HD (a direction from downside to upside as seen from the observer), and the X-direction is a direction from left to right as seen from the observer US. Further, the Z-direction side refers to the downstream side in the Z-direction (the distal end side in the Z-direction), and the opposite side to the Z-direction side refers to the upstream side in the Z-direction (the base end side in the Z-direction). This applies to the other directions.

Figure 3:
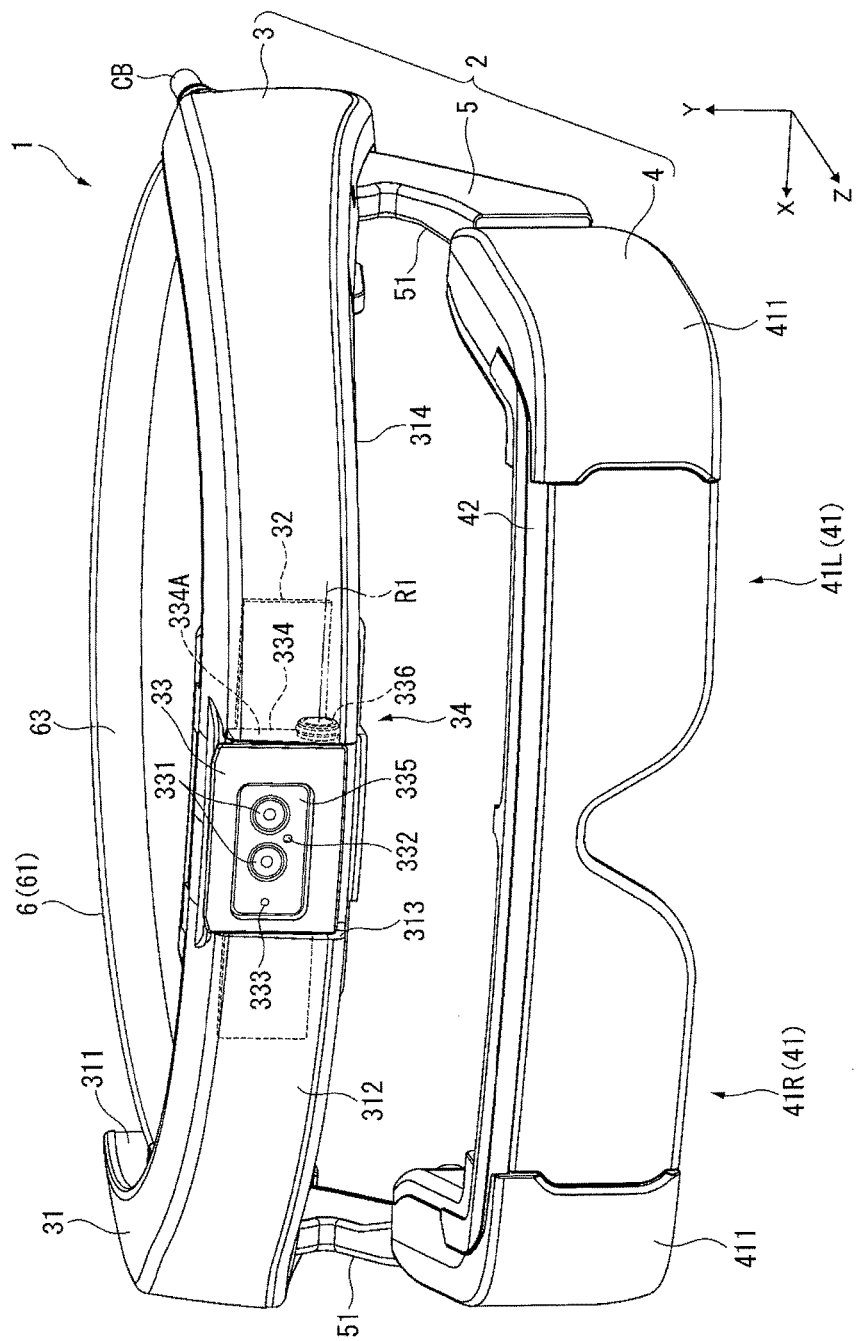
FIG. 3 is a perspective view showing the virtual image display apparatus in the first embodiment as seen from a front side.
Figure 4:
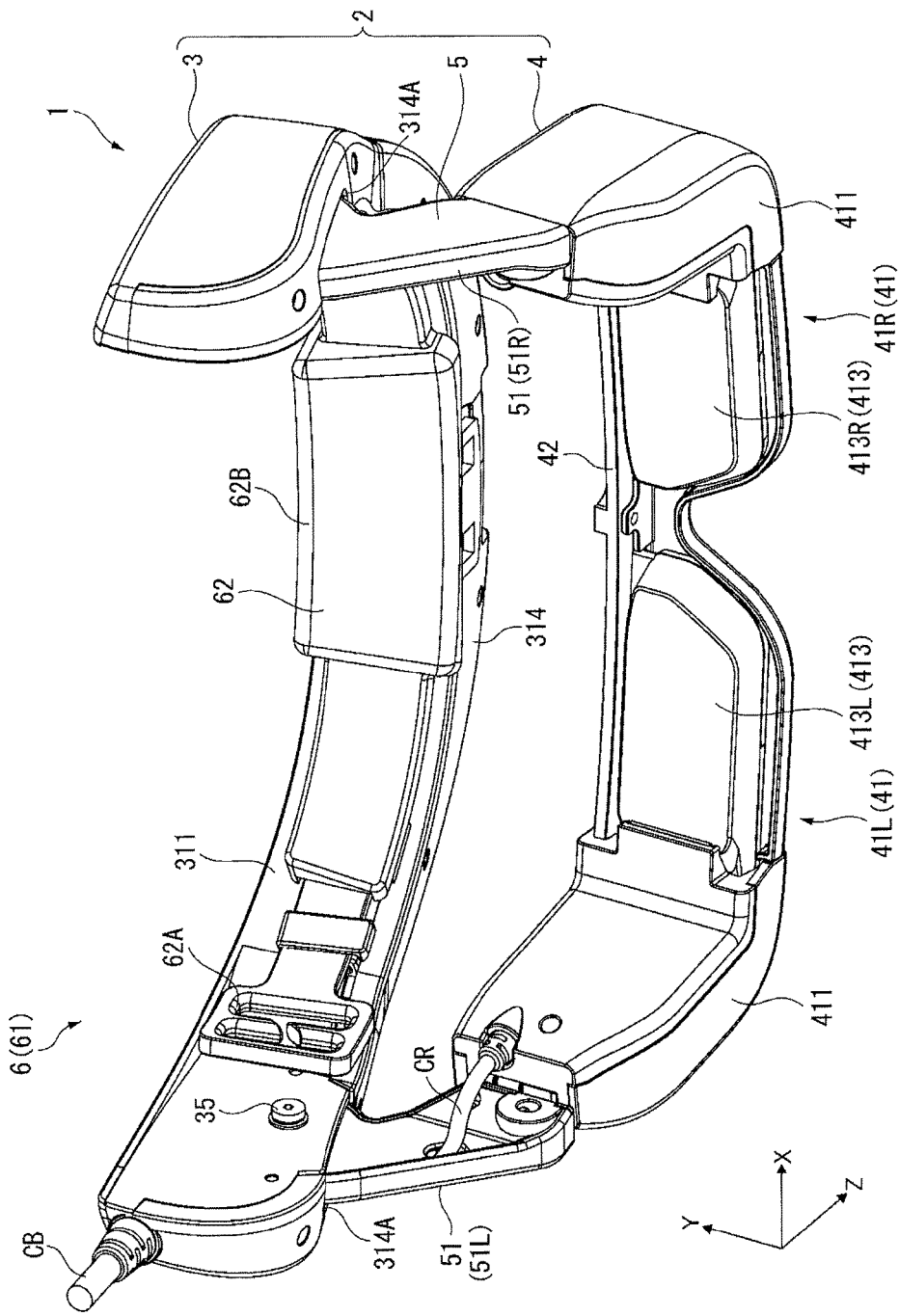
FIG. 4 is a perspective view showing the virtual image display apparatus in the first embodiment as seen from a rear side.

FIGS. 3 and 4 are perspective views of the virtual image display apparatus 1 as seen from a front side and a rear side. In other words, FIG. 3 is the perspective view of the virtual image display apparatus 1 as seen from the opposite side to the observer US side with respect to the virtual image display apparatus 1, and FIG. 4 is the perspective view of the virtual image display apparatus 1 as seen from the observer US side.

As shown in FIGS. 1 to 4, the virtual image display apparatus 1 includes an apparatus main body 2 and an attachment member 6 that fixes the apparatus main body 2 to the head HD. The apparatus main body 2 includes a headband part 3 as a frame, a display unit 4 that displays a virtual image, and a supporting part 5 that is rotatably attached to the headband part 3, supports the display unit 4, and connects the headband part 3 and the display unit 4.

Configuration of Headband Part

The headband part 3 controls part of the functions in the virtual image display apparatus 1, to which one ends of arms 51 forming the supporting part 5 are rotatably attached.

The headband part 3 has an arc-like outer shape along the head HD of the observer US, and, as shown in FIGS. 3 and 4, has a main body case 31 placed along the head HD, and a control unit 32 and an imaging unit 33.

Figure 5:
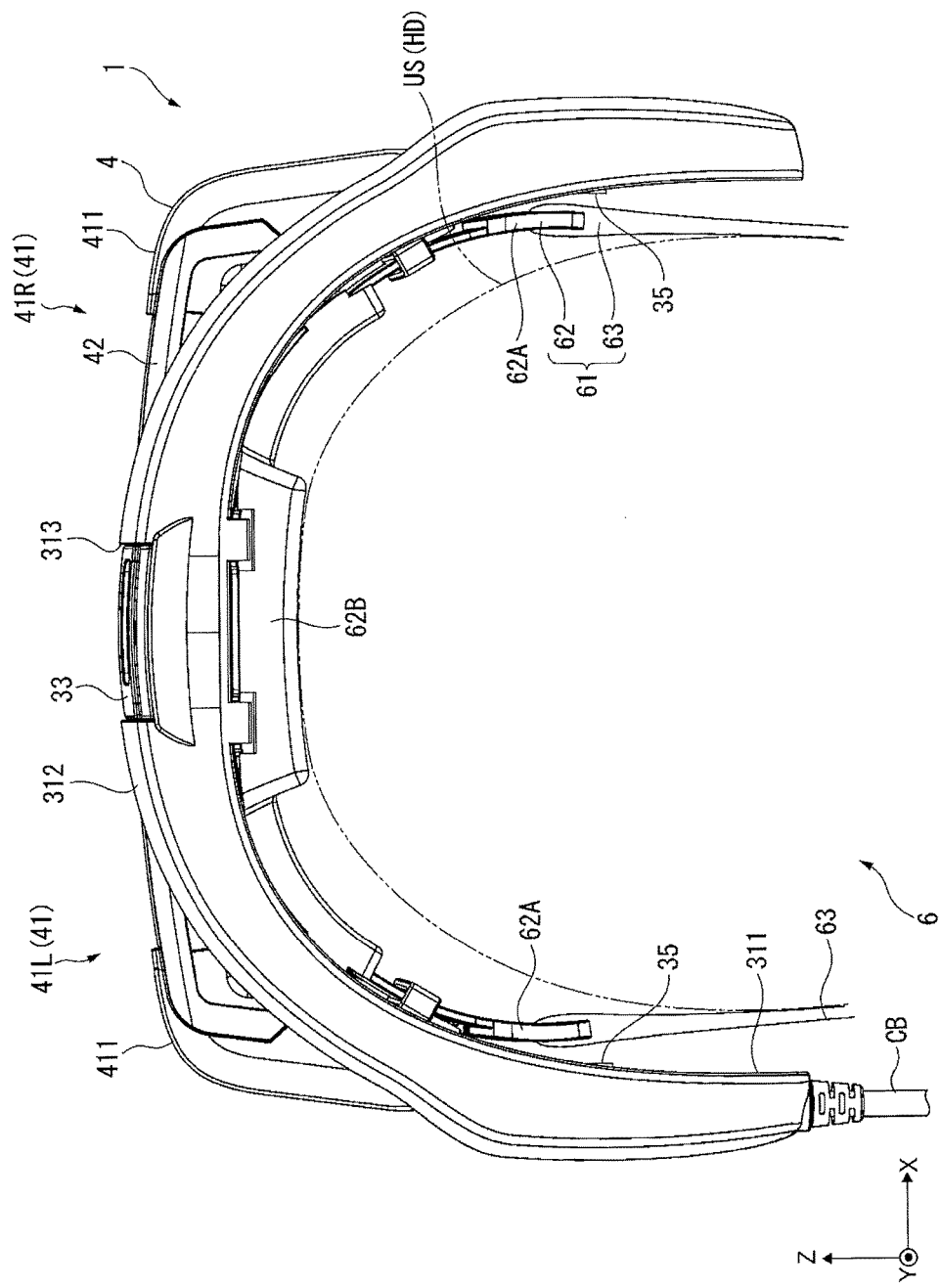
FIG. 5 is a plan view showing the virtual image display apparatus in the first embodiment.

FIG. 5 is a plan view of the virtual image display apparatus 1 as seen from the Y-direction side. Further, FIG. 6 is a side view of the virtual image display apparatus 1 as seen from the opposite side to the X-direction side.

As shown in FIG. 5, the main body case 31 is placed along the forehead part of the observer US (the observer US having the contour shown by a dotted line in FIG. 5), and fixed to the head HD by the attachment member 6. The main body case 31 is a casing that houses the control unit 32 (see FIG. 2), a cable CB, etc. inside and supports the imaging unit 33 and the supporting part 5.

The main body case 31 has a nearly semicircular outer shape (nearly U-shape) along the shape of the forehead part and the temporal parts of the observer US as seen from the Y-direction side. Namely, in the main body case 31, an inner surface 311 opposed to the forehead part and the temporal parts of the observer US is curved along the head of the observer US as seen from the Y-direction side.

Figure 6:
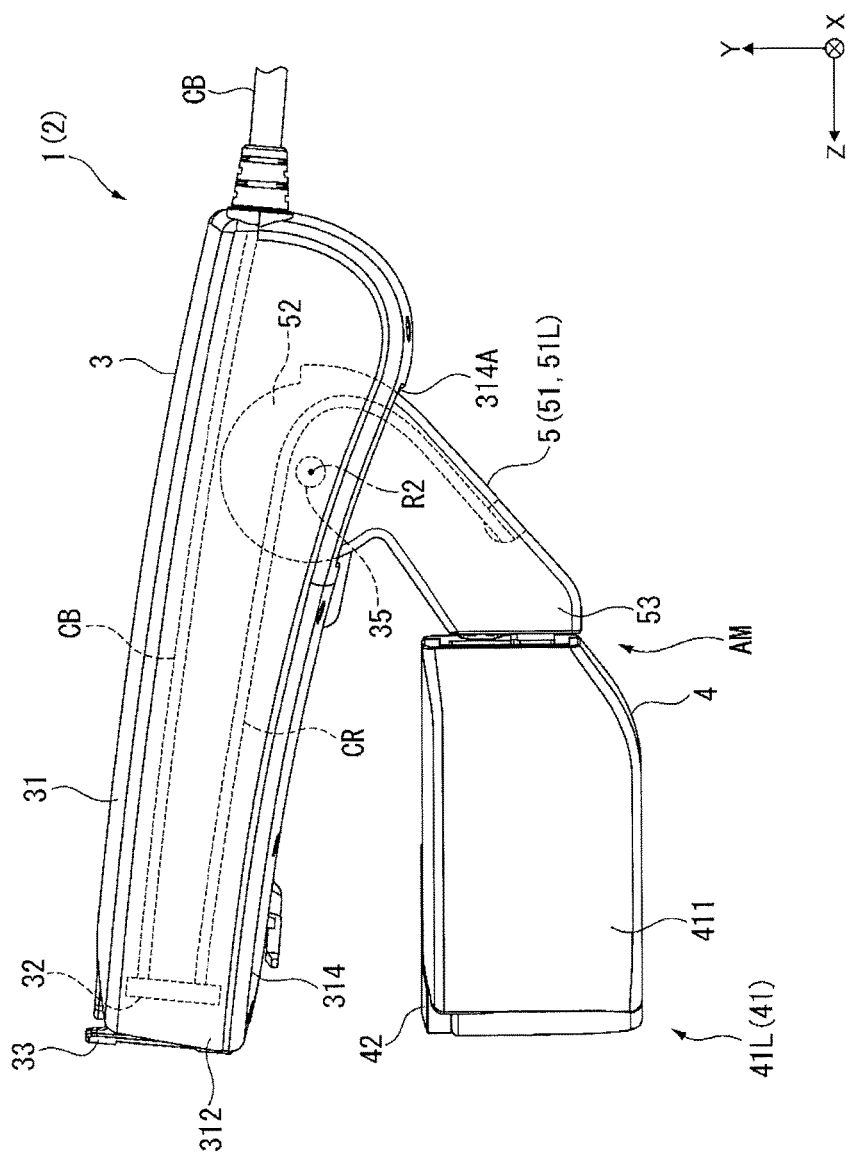
FIG. 6 is a side view showing the virtual image display apparatus in the first embodiment.

Further, as shown in FIG. 6, rotation shaft portions that rotatably and pivotally support one ends of the respective arms 51 are provided near both ends of the arc shape of the main body case 31. As will be described later in detail, the one ends in the respective arms 51 are provided inside of the main body case 31.

The control unit 32 is provided within the main body case 31 and includes a control circuit. The control unit 32 is connected to a controller (not shown) that receives various input operations by the observer US via the cable CB, and controls the operation of the apparatus main body 2 and controls the imaging unit 33 in response to the input operations. Further, the control unit 32 outputs captured images by the imaging unit 33 to the outside via the cable CB.

As shown in FIGS. 3 and 5, the imaging unit 33 is provided nearly at the center in an outer surface 312 located at the opposite side to the inner surface 311 in the main body case 31, and images a partial region ahead of the observer US, i.e., in the field of view of the observer US. As shown in FIG. 3, the imaging unit 33 includes stereo cameras 331, an illuminance sensor 332 that detects illuminance of outside light, an LED 333, and a module casing 334 that houses them inside. The LED 333 functions as, e.g. a power indicator that is on in driving the virtual image display apparatus 1 and off when not in driving.

As shown in FIG. 3, the module casing 334 has a window part 335 covered by a light-transmissive member on the surface at the Z-direction side, the stereo cameras 331 image the outside via the window part 335, and the illuminance sensor 332 detects illuminance of the outside light entering via the window part 335.

Further, on a side surface 334A of the module casing 334 intersecting with the X-direction, a rotation shaft portion 336 projecting from the side surface 334A along the X-direction is provided. Specifically, the rotation shaft portion 336 is protruded in a position opposite to the Y-direction side in the side surface 334A. The rotation shaft portion 336 is supported by a bearing portion (not shown) provided in a concave part 313 of the main body case 31 in which the module casing 334 is provided. These rotation shaft portion 336, bearing portion, etc., form an adjustment mechanism 34 according to the invention. Note that, in FIG. 3, only the rotation shaft portion 336 at the base end side in the X-direction of the two side surfaces 334A is shown, however, the same rotation shaft portion is provided in a position corresponding to the side surface at the distal end side in the X-direction.

The module casing 334 is rotatable within a predetermined range about a rotation shaft R1 in parallel to the X-direction defined by the rotation shaft portion 336. Accordingly, the position of the module casing 334 with respect to the main body case 31 is adjusted, and thereby, the imaging direction of the stereo cameras 331 (i.e., the imaging direction by the imaging unit 33) may be adjusted.

Configuration of Display Unit

The display unit 4 forms an image according to input image information and allows the observer to visually recognize the image as a virtual image. The display unit 4 includes a pair of optical devices 41 respectively provided for the right eye and the left eye of the observer (the optical devices for left eye and right eye are respectively denoted by 41L, 41R) and a frame part 42 having a nearly U-shape that holds the pair of optical devices 41.

Of them, the frame part 42 holds the pair of optical devices 41 at the distal end side in the Y-direction. The optical device for left eye 41L is fixed at the base end side of the frame part 42 in the X-direction and the optical device for right eye 41R is fixed at the distal end side in the X-direction.

Figure 7:
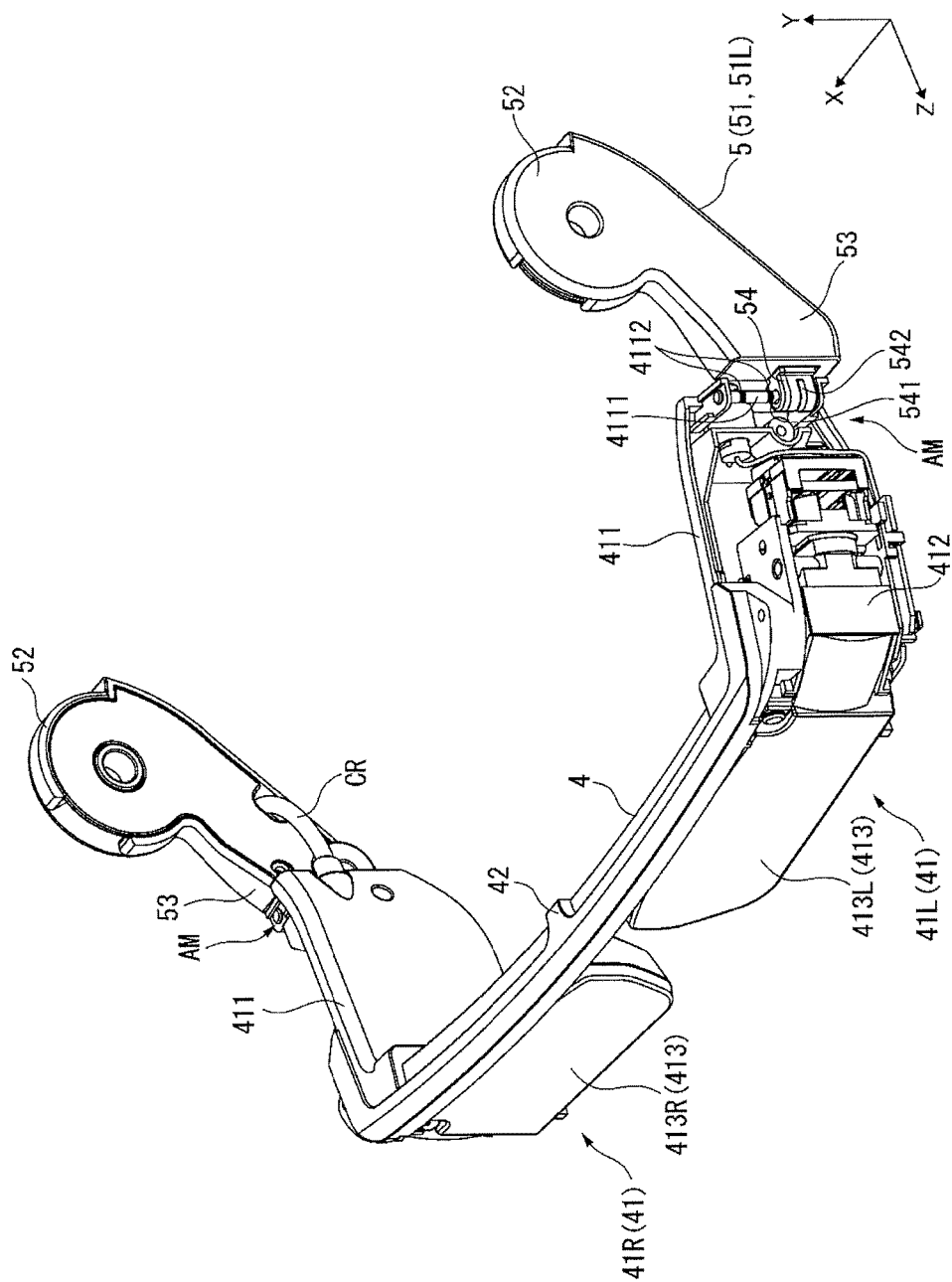
FIG. 7 is a perspective view showing an internal configuration of optical devices in the first embodiment.

FIG. 7 is a perspective view showing an internal configuration of the optical devices 41. In FIG. 7, part of casings 411 is not shown.

The optical device for left eye 41L and the optical device for right eye 41R forming the pair of optical devices 41 have a relationship of mirror symmetry with each other, and the devices respectively correspond to a display part for left eye and a display part for right eye according to the invention. Each of these optical devices 41 has the casing 411, an optical unit 412, and a light guiding member 413.

The casing 411 houses the optical unit 412 inside and is connected to the arm 51 by a movement mechanism AM, which will be described later.

The optical unit 412 modulates light entering from a light source into image light according to input image information using a light modulator, and outputs the image light to the corresponding light guiding member 413. As the light modulator, e.g. a device using a liquid crystal panel or a micro mirror such as an MEMS (Micro Electro Mechanical System) mirror.

The light guiding members 413 (the light guiding members for right eye and left eye are respectively denoted by 413R, 413L) are placed in positions corresponding to the eyes of the observer US. The light guiding member 413 has a semi-transmissive layer (semi-reflective layer) inside and enables observation of the outside world via the semi-transmissive layer, and further, the image light output from the optical unit 412 and reflected by the semi-transmissive layer enters the eye and a virtual image is visually recognized. The light guiding member 413 is principally formed using a resin exhibiting higher light transmissivity in a visible region (e.g. cycloolefin polymer).

Note that, as shown in FIGS. 6 and 7, cables CR that output image information (image signals) to the optical units 412 are connected to the optical devices 41R, 41L, and the cables CR extend to the outside of the casings 411, then, are inserted into the corresponding arms 51, pass from the arms 51 through the main body case 31, and are connected to the control unit 32.

Figure 8:
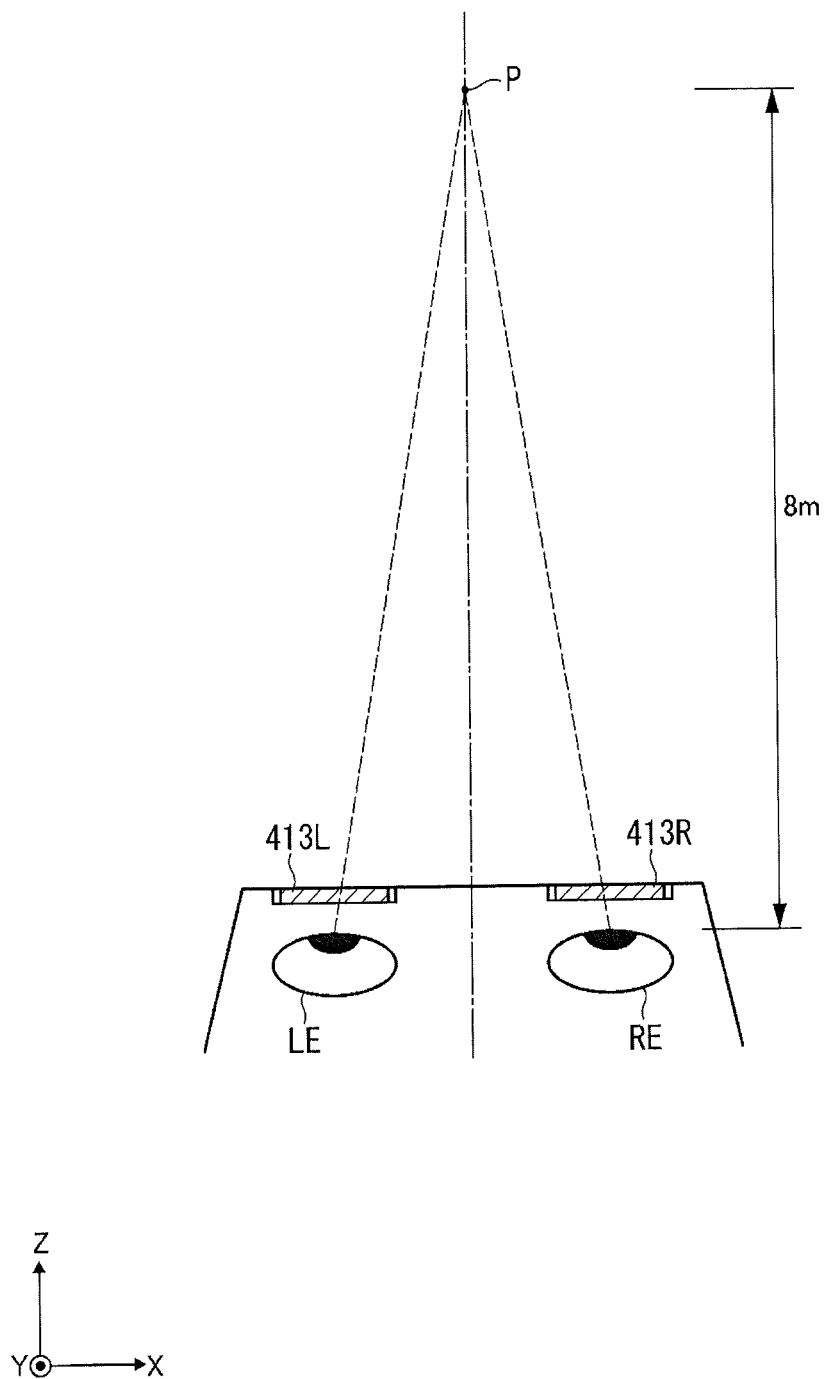
FIG. 8 is a schematic diagram showing a relationship between placement of light guiding members and a display distance in the first embodiment.

FIG. 8 is a schematic diagram showing a relationship between placement of the light guiding members 413 and a distance to an intersection point P of lines of sight of the eyes (display distance).

Here, the placement of the light guiding members 413 is explained.

As described above, the image lights output from the respective optical units 412 are guided to the left eye and the right eye of the observer US via the corresponding light guiding members 413L, 413R, and images corresponding to the image lights are visually recognized by the observer US as virtual images. In the embodiment, as shown in FIG. 8, these light guiding members 413L, 413R are placed and adapted so that the image may be appropriately observed when the intersection point P at which the lines of sights of the left eye LE and the right eye RE of the observer US intersect is located at nearly eight meters ahead (in the Z-direction) of the left eye LE and the right eye RE. The position of the intersection point P depends on the angle of convergence of the respective eyes LE, RE of the observer US.

That is, when a human observes an observation object located farther (the display distance is longer), the angle of convergence is smaller, and, when the human observes an observation object located nearer (the display distance is shorter), the angle of convergence is larger. In other words, when the lines of sight of the eyes are directed so that the angle of convergence may be smaller, the display distance is longer, and, when the lines of sight of the eyes are directed so that the angle of convergence may be larger, the display distance is shorter.

Accordingly, in the embodiment, the angle of convergence of the observer US when the displayed image is observed is adjusted by adjustment of the placement of the light guiding members 413L, 413R that guide the image lights passing through the interior to the eyes by the semi-transmissive layers and the positions of the semi-transmissive layers, and thereby, the display distance is adjusted and the image is observed in the position of the intersection point P.

Note that, when the position of the intersection point P is set in the position at nearly eight meters ahead of the eyes LE, RE, the displayed image (the visually recognized virtual image) is observed as if it were located at infinity.

Configuration of Supporting Part

The supporting part 5 is rotatably attached to the main body case 31 to support the display unit 4 as described above, and includes the pair of arms 51 as shown in FIGS. 3 and 4 in the embodiment.

As shown in FIGS. 6 and 7, each of the pair of arms 51 (the arm located on the left for the observer US is denoted by 51L and the arm located on the right is denoted by 51R) has a first end portion 52 and a second end portion 53.

The first end portion 52 is an end portion opposite to the Z-direction side in the arm 51 and formed nearly in a circular shape as seen from the X-direction side. As shown in FIG. 6, the first end portion 52 is inserted through an opening portion 314A formed in a lower surface 314 of the main body case 31 (the surface 314 opposite to the Y-direction side) and pivotally supported by the rotation shaft portion 35 within the main body case 31. Accordingly, the arm 51 is rotatable in a predetermined range around a rotation shaft R2 passing through the pivotally supported position of the first end portion 52 and in parallel to the X-direction. Note that the X-direction is a direction in parallel to the direction in which the eyes of the observer US wearing the virtual image display apparatus 1 are arranged, and thereby, the respective arms 51 are movable around the rotation shafts R2 along the arrangement direction (the rotation shafts R2 nearly orthogonal to the visual direction). Further, the rotation shaft portion 35 is located in the position corresponding to the temple of the observer US in the headband part 3, and the first end portion 52 in the arm 51 is located in the position corresponding to the temple.

The second end portion 53 is an end portion on the Z-direction side in the arm 51, and connected to a corresponding end portion of the end portions of the display unit 4 in the right-to-left direction for the observer US. A sliding member 54 forming the movement mechanism AM, which will be described later, is provided in the second end portion 53. A guide rail 4111 also forming the movement mechanism AM and provided within the casing 411 of the display unit 4 is inserted through the sliding member 54, and thereby, the second end portion 53 and the display unit 4 (casing 411) are connected.

As shown in FIG. 6, the cable CR inserted from the display unit 4 (casing 411) into the arm 51 passes through the arm 51 and enters the main body case 31 from the first end portion 52. Then, the cable CR is connected to the control unit 32 within the main body case 31.

Figure 9:
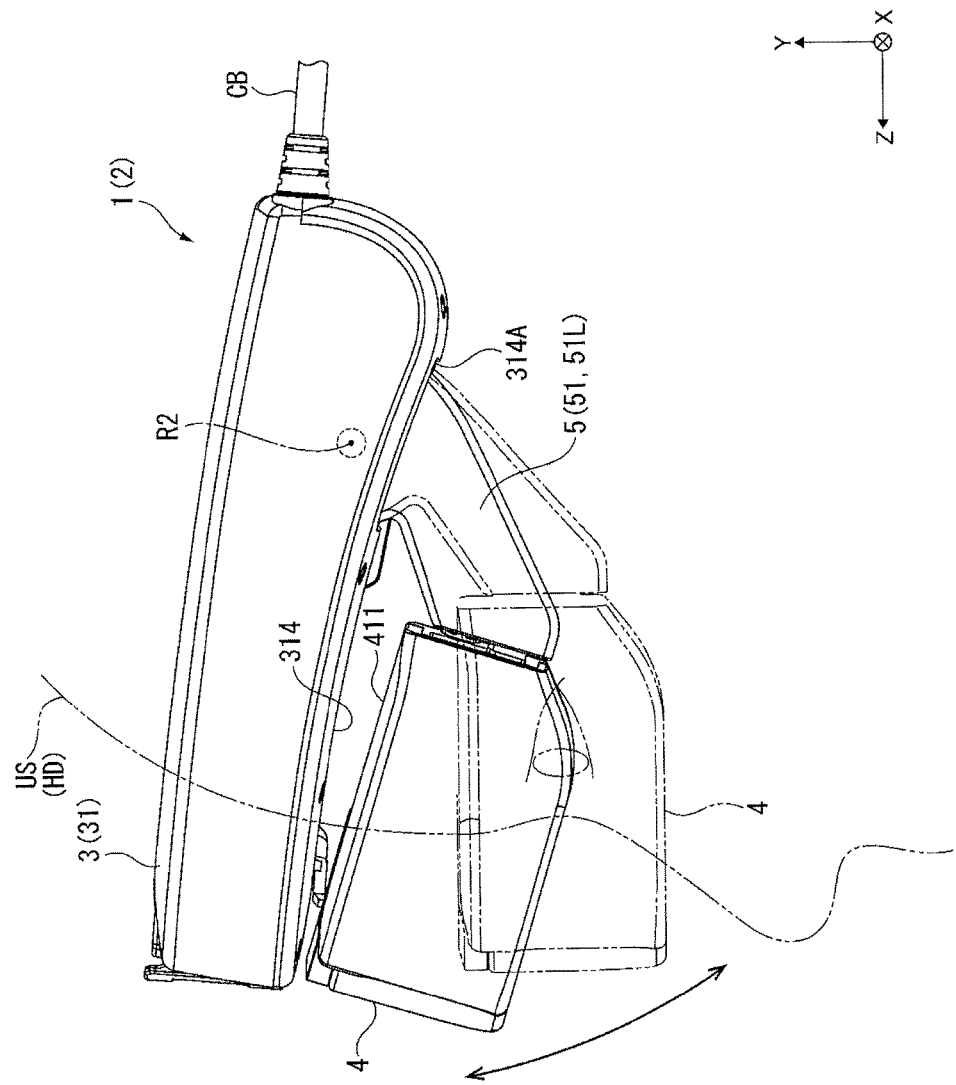
FIG. 9 is a side view showing the virtual image display apparatus with an arm rotated in the first embodiment.

FIG. 9 shows a rotation of the arm 51 supporting the display unit 4 with respect to the main body case 31. Note that FIG. 9 shows that the arm 51 is rotated clockwise around the rotation shaft R2 from the state shown in FIG. 6 as seen from the opposite side to the X-direction side.

In the embodiment, as shown in FIG. 9, the respective arms 51 are rotatable around the rotation shafts R2 toward the headband part 3 until the end portions at the Y-direction side in one of the display unit 4 and the arms 51 come into contact with the headband part 3 side (main body case 31). On the other hand, the respective arms 51 are rotatable in the opposite direction to the above described direction until the end portions at the opposite side to the Z-direction side in the edges of the opening portions 314A come into contact with the arms 51.

The arms 51 are rotated in the above described manner, and the position and the angle of the display unit 4 may be adjusted. Thereby, as shown in FIG. 9, the display unit 4 may be moved to the position where the virtual image is harder to be visually recognized, i.e., the position where the outside world (around the observer US) is more easily observed.

Configuration of Movement Mechanism

Two of the movement mechanisms AM are provided in correspondence with the number of the casings 411 of the display unit 4 and the arms 51, and connect the casings 411 and the arms 51 movably in directions in which the display unit 4 is moved closer to and away from the headband part 3 (i.e., in the Y-direction and the opposite direction to the Y-direction). As shown in FIG. 7, the movement mechanism AM includes the guide rail 4111 provided in the casing 411 and the sliding member 54 provided in the second end portion 53 of the arm 51.

The guide rails 4111 are supported by the sliding members 54 to be movable in the Y-direction and the opposite direction to the Y-direction and respectively fixed inside of the casings 411. The guide rail 4111 is a cylindrical member and placed so that the axial direction may be along the Y-direction when the traveling direction of the image light from the light guiding member 413 toward the eye of the observer is in parallel to the Z-direction. On an outer circumferential surface of the guide rail 4111, grooves 4112 along the circumferential direction for determining the stop position of the guide rail 4111 are formed in a plurality of positions along the axial direction, so that the guide rail 4111 is moved in a stepwise manner with respect to the sliding member 54 and click feelings are caused when the guide rail 4111 is moved.

As described above, the sliding members 54 are protruded on the surfaces at the Z-direction side in the second end portions 53 of the respective arms 51. These sliding members 54 slidably support the guide rails 4111 along the axial direction of the guide rails 4111.

The sliding member 54 has a hole portion 541 through which the guide rail 4111 is inserted, a slit 542 formed to cross the hole portion 541 in the intermediate position in the Y-direction, and an O-ring (not shown) formed using an elastic material such as ANNAN rubber. Of them, the O-ring is provided in the slit 542 and the guide rail 4111 is inserted through the O-ring. The O-ring tightens the guide rail 4111 in the inner radial direction, and thereby, the guide rail 4111 is slidably supported with respect to the sliding member 54 while an appropriate resistance is applied thereto. Then, the O-ring is fitted in the groove 4112 of the guide rail 4111, and thereby, their relative position is maintained. However, the configuration of the movement mechanism AM is not limited to that. The sliding member 54 may be relatively movable continuously along the height direction of the guide rail 4111. In this case, the grooves 4112 are not necessarily provided.

Figure 10:
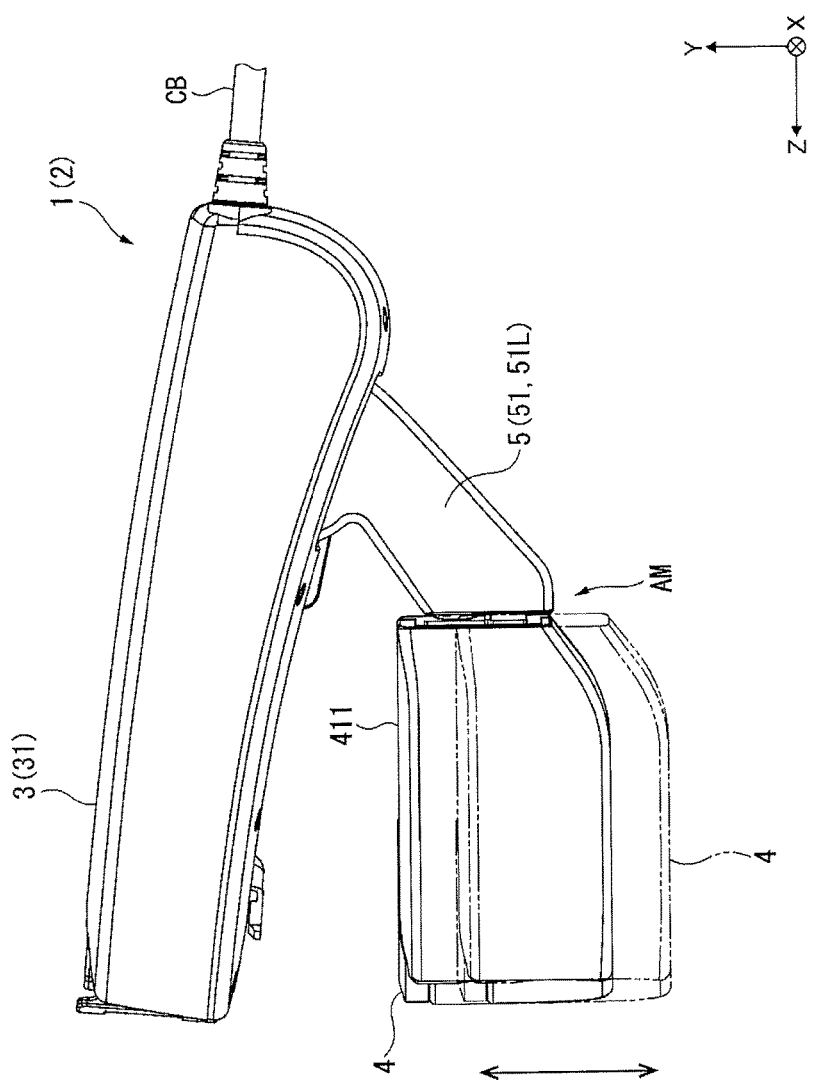
FIG. 10 is a side view showing the virtual image display apparatus with a display unit moved in the first embodiment.

FIG. 10 shows the movement of the display unit 4 by the movement mechanism AM as seen from the opposite side to the X-direction side. Note that FIG. 10 shows that the arm 51 is positioned with respect to the headband part 3 so that the movement direction of the display unit 4 may be along the Y-direction.

By the movement mechanism AM, as shown in FIG. 10, the display unit 4 including the casing 411 having the guide rail 4111 is movable along the Y-direction with respect to the arm 51 having the sliding member 54. Thereby, the distance between the headband part 3 and the display unit 4 may be adjusted. Therefore, the display unit 4 may be moved to the position in which the observer US wearing the virtual image display apparatus 1 easily observes the displayed image (virtual image).

Configuration of Attachment Member

The attachment member 6 attaches the apparatus main body 2 (specifically, the headband part 3) to the head HD as described above. In the embodiment, the attachment member 6 includes a band 61 as a fixing part attached to the headband part 3.

As shown in FIGS. 3 to 5, the band 61 has a band main body 62 (FIGS. 4 and 5) attached to the inner surface 311 of the main body case 31 and a belt portion 63 (FIGS. 3 and 5) attached to the band main body 62.

As shown in FIGS. 4 and 5, the band main body 62 is a horizontally-long belt-like member and fixed to the inner surface 311 so that the longitudinal direction may be along the inner surface 311 of the headband part 3. The band main body 62 includes annular portions 62A to which the belt portion 63 is attached on both ends, and further includes a contact portion 62B having a contact surface curved along the curved shape of the forehead part of the observer US in contact with the forehead part nearly at the center. Note that the contact portion 62B is detachably attached to the band main body 62 and the contact portions 62B having different dimensions can be attached depending on the observer US.

The belt portion 63 forms the annular band 61 with the band main body 62. The belt portion 63 is formed using e.g. a stretchy belt-like member and, as shown in FIGS. 3 and 5, its ends are attached to the annular portions 62A. The belt portion 63 presses the contact position with the head HD toward the band main body 62 from the position opposite to the head HD with respect to the band main body 62, and thereby, not only the band 61 but also the headband part 3 are fixed to the head HD of the observer US.

Advantages of First Embodiment

According to the above described virtual image display apparatus 1 of the embodiment, the following advantages are obtained.

The headband part 3 as the frame along the head HD of the observer US is fixed to the position in which the virtual image displayed by the display unit 4 connected to the headband part 3 via the arms 51 of the supporting part 5 can be visually recognized by the observer US. Thereby, the headband part 3 is placed along the head HD (forehead) and fixed, and the load of the virtual image display apparatus 1 on the nose and the ears of the observer may be suppressed. Therefore, the load on the observer US in use of the virtual image display apparatus 1 may be reduced and the feeling of use and the feeling of wearing may be improved.

The respective arms 51 of the supporting part 5 are rotatable around the connection parts to the headband part 3, and thereby, the position and the angle of the display unit 4 with respect to the headband part 3 may be adjusted by rotation of the arms 51. According to the configuration, the display unit 4 is located in the position in response to the direction of lines of sight of the observer US in wearing and the visual recognition of the virtual image displayed by the display unit 4 may be improved. Further, when the virtual image is not visually recognized, the display unit 4 may be removed from the front of the eyes of the observer. Therefore, the convenience of the virtual image display apparatus 1 may be improved.

The respective arms 51 are connected to the headband part 3 rotatably around the rotation shafts R2. Thereby, the position of the display unit 4 may be easily adjusted by the rotation operation with respect to the arms 51, and further, when the virtual image is not virtually recognized, the display unit 4 may be reliably removed from the front of the eyes of the observer US. Therefore, the convenience of the virtual image display apparatus 1 may be reliably improved.

The first end portions 52 in the respective arms 51 of the supporting part 5 are located in the positions corresponding to the temples of the observer US in the headband part 3 as the frame, and thereby, the respective arms 51 extend from the positions corresponding to the temples and are connected to the display unit 4. According to the configuration, contact of the respective arms 51 with the ears of the observer US in wearing of the virtual image display apparatus 1 may be suppressed. Therefore, the feeling of wearing of the virtual image display apparatus 1 may be further improved.

The supporting part 5 has the pair of arms 51 respectively supporting the display unit 4, and thereby, the display unit 4 may be stably supported. Therefore, when the observer US wears the virtual image display apparatus 1 and visually recognizes the image, wobble of the display unit 4 may be suppressed.

The movement mechanism AM moves the display unit 4 in directions closer to or away from the headband part 3. According to the configuration, the position of the display unit 4 may be easily adjusted to overlap with the visual direction according to the positions of the eyes of the observer US. Therefore, the position of the display unit 4 may be adjusted according to the observer US, and the convenience and the versatility of the virtual image display apparatus 1 may be improved.

A partial region in the field of view of the observer US may be imaged by the imaging unit 33 provided in the headband part 3. For example, the captured image by the imaging unit 33 is displayed on the display unit 4 or the captured image is output to the outside, and thereby, the surroundings of the observer US may be grasped by the observer US or the others.

Here, if the imaging unit 33 is located in the display unit 4, it is considered that the weight balance of the virtual image display apparatus 1 is lost due to the load of the imaging unit 33. On the other hand, the imaging unit 33 is provided in the headband part 3, and thereby, the weight of the display unit 4 may be reduced and the right weight balance of the virtual image display apparatus 1 may be easily achieved. Therefore, the load on the observer US may be further reduced.

The imaging unit 33 is adapted to be rotatable about the rotation shaft R1. Thereby, the imaging direction of the imaging unit 33 may be adjusted to the position in response to the visual direction of the observer US. Therefore, at least a partial region in the field of view of the observer US may be reliably imaged by the imaging unit 33.

The control unit 32 controlling at least part of the functions of the virtual image display apparatus 1 is provided within the headband part 3. Thereby, as is the case of the imaging unit 33, compared to the case where the control unit 32 is provided in the display unit 4, the weight of the display unit 4 may be reduced and the right weight balance of the virtual image display apparatus 1 may be easily achieved. Therefore, the load on the observer US may be further reduced.

Here, if a cable is extended from the display unit directly to the outside, it is necessary to increase the strengths of the casings 411 forming the outer shapes of the respective optical devices 41 of the display unit 4 and the frame part 42 in consideration of the movement of the cable. Further, there is a problem of a bad appearance if the cable extends from the display unit 4 to the outside.

On the other hand, the cables CR extending from the casing 411 of the display unit 4 pass through the arms 51 and the headband part 3 and are connected to the control unit 32. Further, the cable CB extending from the control unit 32 passes through the headband part 3 and extends to the outside. According to the configuration, it is not necessary to increase the strengths of the casings 411, the frame part 42, etc., and further, the appearance of the virtual image display apparatus 1 may be made better.

The headband part 3 has the arc-like outer shape along the head HD of the observer US. According to the configuration, the headband part 3 may be easily disposed along the head HD, and thereby, the feeling of wearing of the virtual image display apparatus 1 may be improved, and further, the appearance of the virtual image display apparatus 1 in wearing may be made better.

The display unit 4 has the optical device for left eye 41L and the optical device for right eye 41R, and thereby, the same virtual image may be respectively visually recognized by the left eye LE and the right eye RE of the observer US, and additionally, for example, respectively different virtual images including parallax images may be visually recognized. Therefore, the convenience and the versatility of the virtual image display apparatus 1 may be improved.

The virtual image display apparatus 1 employs the see-through configuration having the light guiding members 413 (413L, 413R) that guide the light forming the virtual image to the eyes of the observer US and transmit the outside light. Thereby, the virtual images and the region around the observer US may be observed via the light guiding members 413. Accordingly, a sense of safety may be provided to the observer US during visual recognition of the virtual images and the virtual images superimposed on the surrounding scenery are visually recognized by the observer, and thereby, augmented reality (AR) may be realized. Therefore, the convenience and the versatility of the virtual image display apparatus 1 may be further improved.

The headband part 3 is fixed to the head of the observer US by the attachment member 6 having the band 61 as a fixing part, and thereby, the headband part 3 may be reliably fixed. Therefore, the feeling of wearing of the virtual image display apparatus 1 may be further improved.

Second Embodiment

Next, the second embodiment of the invention will be explained.

A virtual image display apparatus according to the embodiment has a similar configuration to that of the above described virtual image display apparatus 1, and differs from the virtual image display apparatus 1 in the placement of the display unit and the configuration for attachment of the virtual image display apparatus to the head. In the following explanation, the same signs are assigned to the parts that are the same or nearly the same as the parts that have been explained and their explanation will be omitted.

Figure 11:
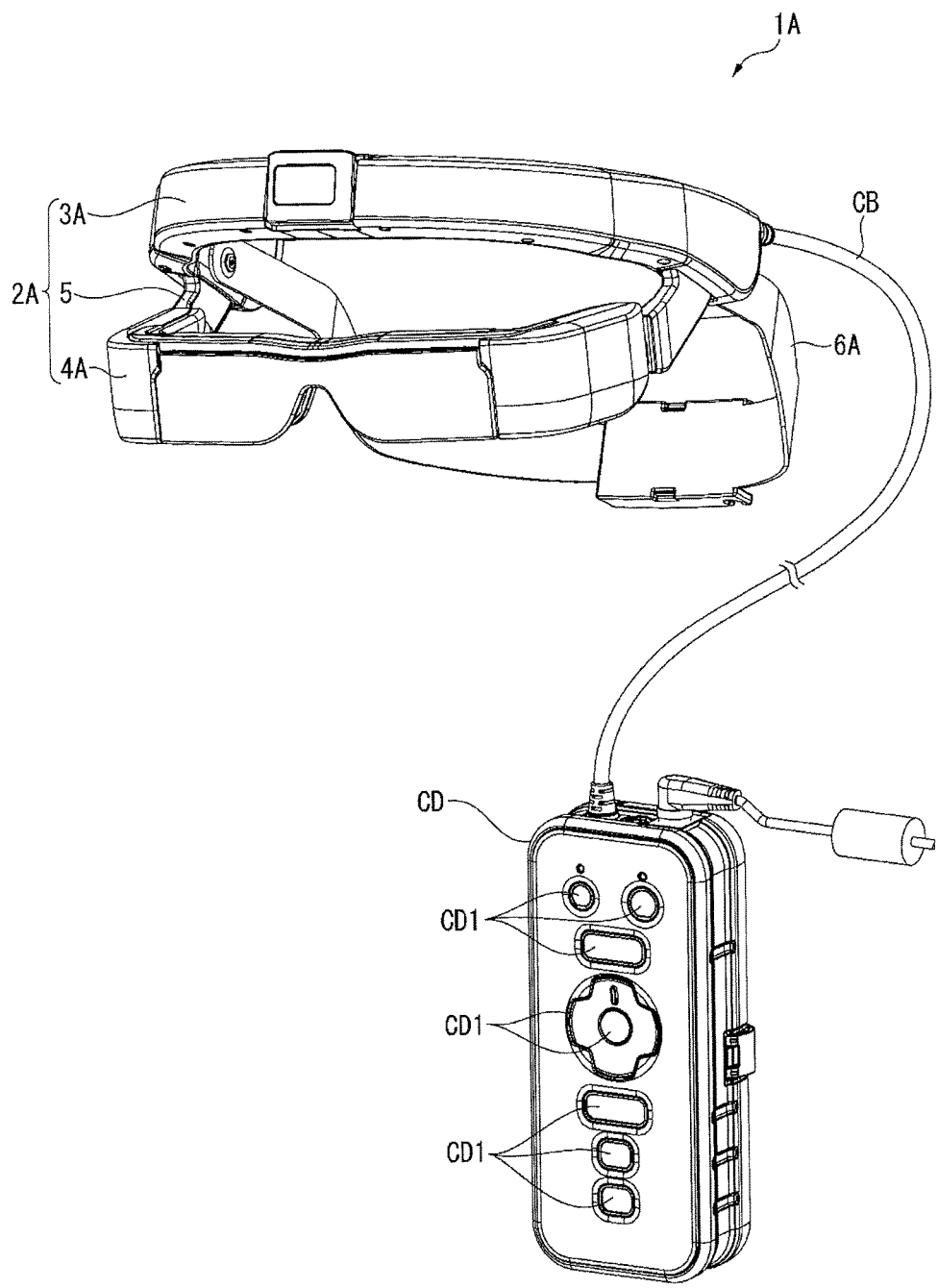
FIG. 11 is a perspective view showing a virtual image display apparatus according to the second embodiment of the invention.

FIG. 11 is a perspective view showing a virtual image display apparatus 1A according to the embodiment. FIG. 11 shows a control device CD with opened engaging tabs that lock a cover member provided on the rear surface of the control device CD, however, the control device CD is used with the closed engaging tabs for fixing the cover member.

The virtual image display apparatus 1A according to the embodiment has the similar configuration and functions to those of the virtual image display apparatus 1. Specifically, as shown in FIG. 11, the virtual image display apparatus 1A is a head mounted image display apparatus that operates based on control signals (including image signals and operation signals) input from the control device CD connected via a cable CB, and allows an observer US wearing the virtual image display apparatus 1A to visually recognize an image as a virtual image.

Figure 12:
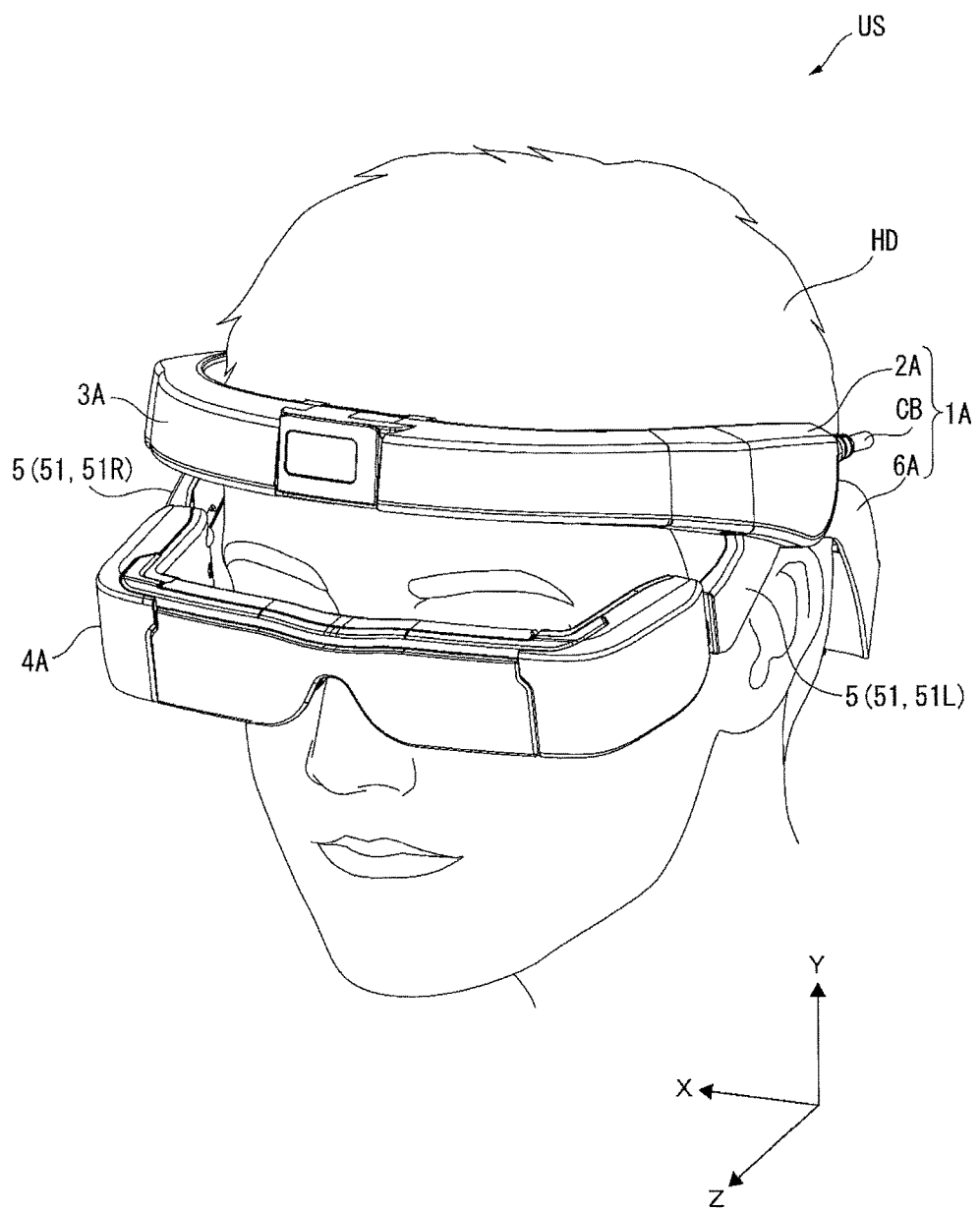
FIG. 12 is a perspective view showing the virtual image display apparatus directly attached to an observer in the second embodiment.
Figure 13:
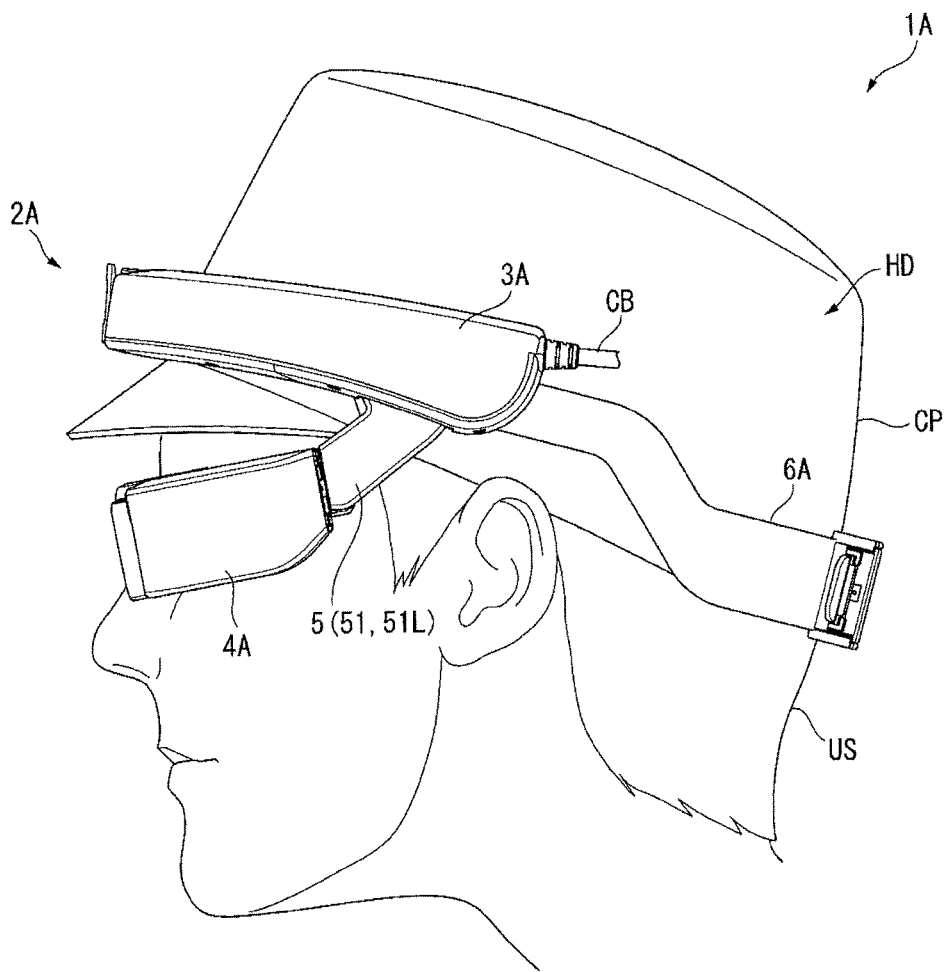
FIG. 13 is a side view showing the virtual image display apparatus attached to an observer wearing a cap in the second embodiment.

FIG. 12 is a perspective view showing the virtual image display apparatus 1A directly attached to the head HD of the observer US as seen from the left front side, and FIG. 13 is a left side view showing the virtual image display apparatus 1A attached to the head HD of the observer US wearing a cap CP (a side view as seen from the opposite side to the X-direction side).

As shown in FIGS. 12 and 13, the virtual image display apparatus 1A has the same functions as the virtual image display apparatus 1, and can be directly attached to the head HD of the observer US and indirectly attached to the head HD via the cap CP, a hard hat, or the like. Accordingly, in the embodiment, the head HD not only directly refers to the head HD but also refers to the head HD wearing the cap CP, a hard hat, or the like.

The above described virtual image display apparatus 1A includes an apparatus main body 2A and an attachment member 6A, and the apparatus main body 2A has a headband part 3A as a frame, a display unit 4A, and a supporting part 5.

Configuration of Headband Part

Figure 14:
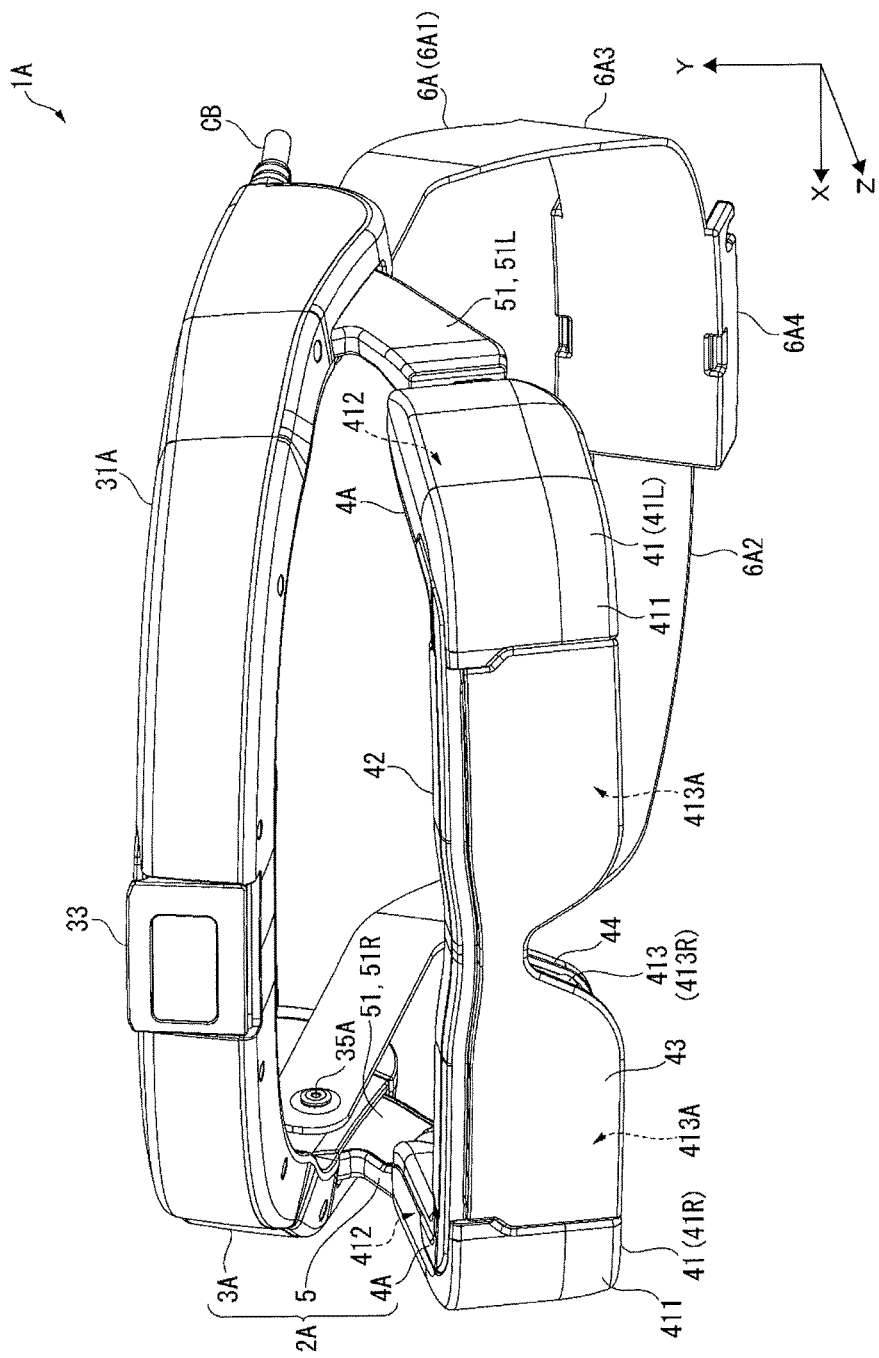
FIG. 14 is a perspective view showing the virtual image display apparatus in the second embodiment as seen from a left front side.
Figure 15:
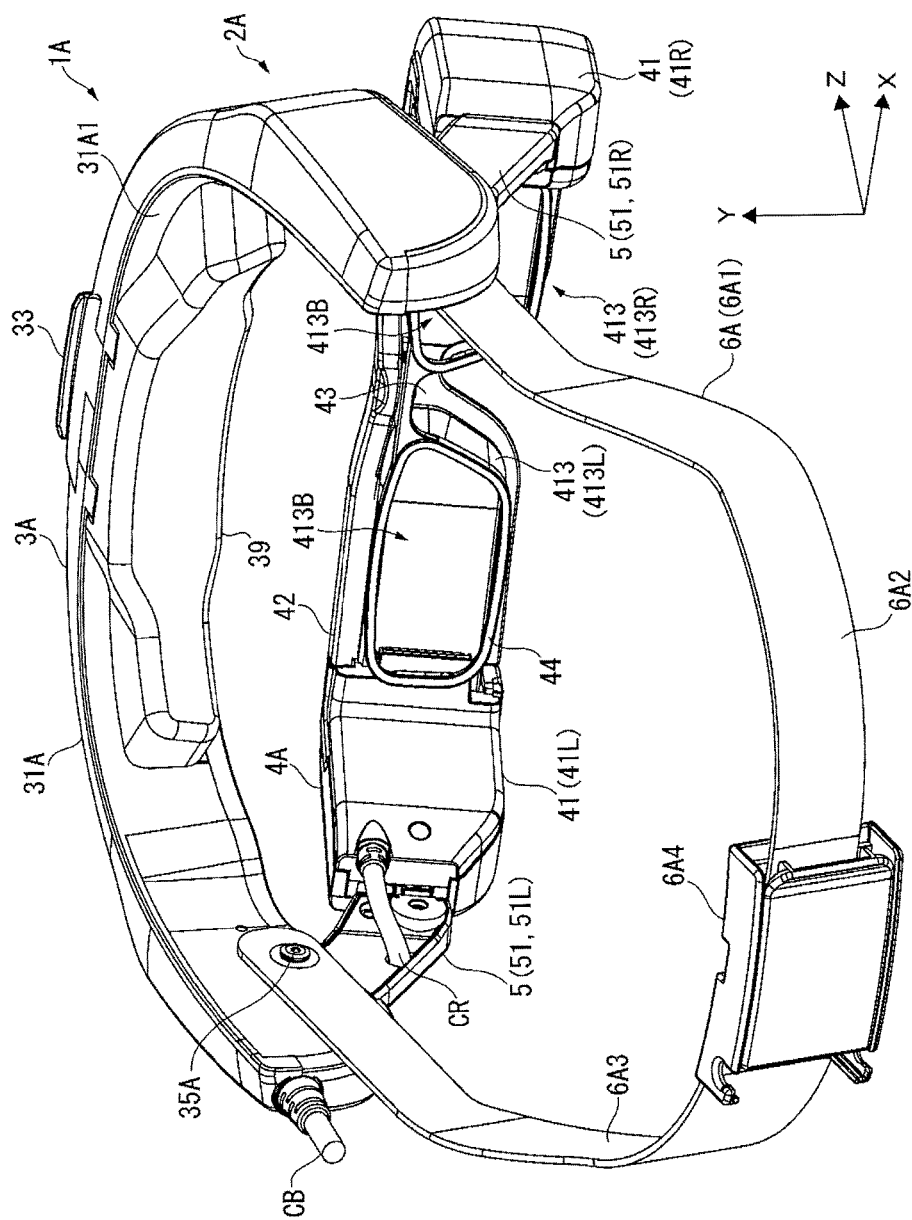
FIG. 15 is a perspective view showing the virtual image display apparatus in the second embodiment as seen from a right rear side.
Figure 16:
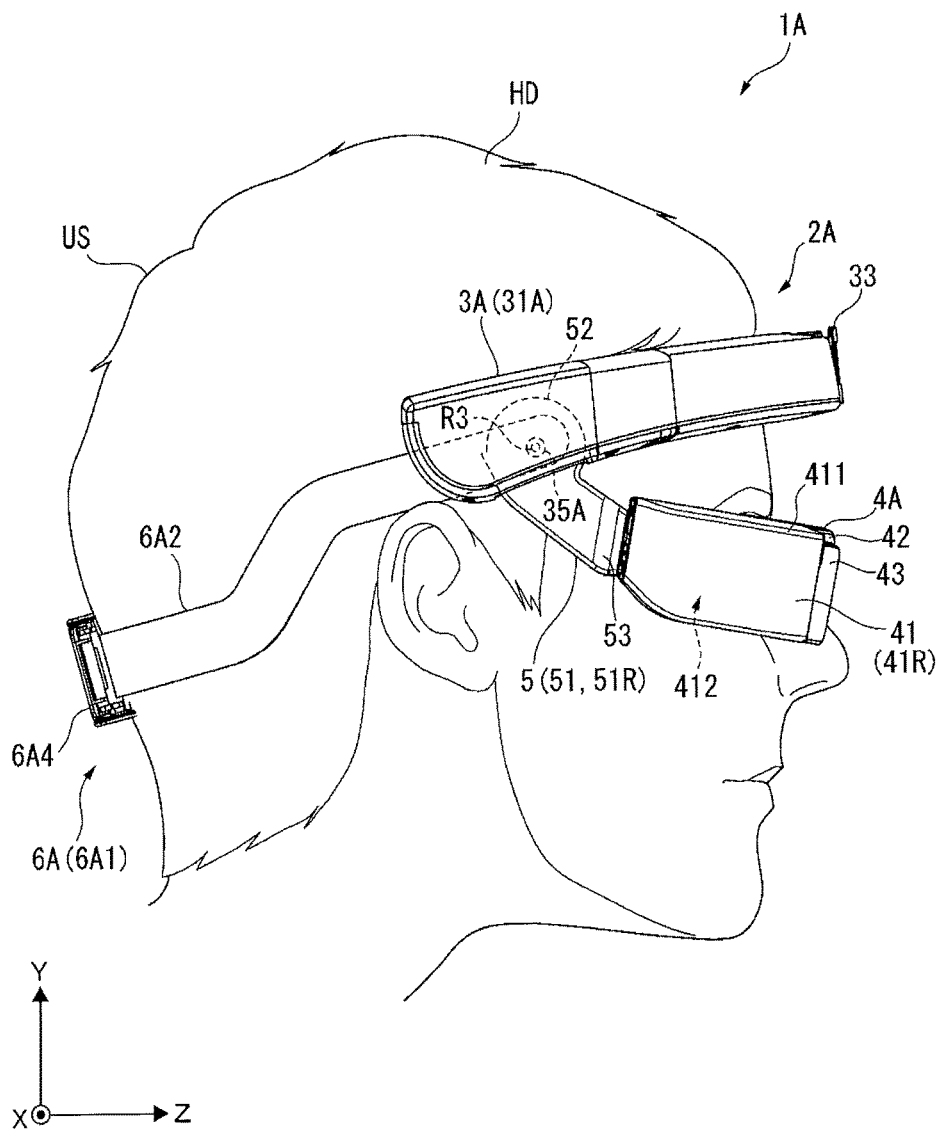
FIG. 16 is a side view showing the virtual image display apparatus in the second embodiment.

FIG. 14 is a perspective view showing the virtual image display apparatus 1A as seen from a left front side and FIG. 15 is a perspective view showing the virtual image display apparatus 1A as seen from a right rear side. Further, FIG. 16 is a right side view showing the virtual image display apparatus 1A.

The headband part 3A is a part that sandwiches the head HD with the attachment member 6A, which will be described later, to attach the virtual image display apparatus 1A to the head HD like the above described headband part 3. As shown in FIGS. 14 to 16, the headband part 3A has a main body case 31A placed in correspondence with the position from the forehead to the upper portions of the ears of the head HD (when the cap CP, the hard hat, or the like is attached to the head HD, from the part corresponding to the forehead of the observer US to the parts corresponding to the upper portions of the ears). The main body case 31A has nearly the same outer shape as the above described main body case 31. Specifically, the main body case 31A has a nearly semi-circular arc-like shape along the forehead part of the head HD as seen from the Y-direction side and has an arc-like shape gently extending to the opposite side to the Y-direction side toward the opposite side to the Z-direction side as seen from the X-direction side. In other words, the headband part 3A has a nearly U-shaped arc-like shape along the forehead and the temporal parts of the head HD as seen from the Y-direction side.

In the main body case 31A, like the above described main body case 31, a control unit 32 (not shown in FIGS. 14 to 16) and an imaging unit 33, and the cable CB connected to the control unit 32 and extending to the outside are provided. In addition, the attachment member 6A is provided in positions near both ends of the main body case 31A to be rotatable in the vertical directions about rotation shafts R3 along the X-direction. Note that, though the detailed explanation is omitted, the attachment member 6A has an attachment belt 6A1 as a fixing part having two bands 6A2, 6A3, a buckle 6A4 that combines the bands, and the length dimension of the attachment belt 6A1 can be adjusted by the buckle 6A4.

Further, as shown in FIG. 15, a pad 39 formed in a curved shape along the shape of the forehead part and brought into contact with the forehead part is detachably attached nearly at the center in an inner surface 31A1 (the surface at the observer US side) of the main body case 31A.

Further, arms 51 of the supporting part 5 rotatably attached by rotation shaft portions 35A coaxially with the rotation shafts R3 are attached to the positions near the ends of the main body case 31A. The configuration of the supporting part 5 and the movement mechanism AM formed by the portions of the supporting part 5 have the same configurations as those employed in the above described virtual image display apparatus 1.

The display unit 4A has the same functions as those of the above described display unit 4, allows image lights to enter the observer US, and thereby, allows the observer to visually recognize the image according to the image lights as a virtual image. As shown in FIGS. 14 to 16, the display unit 4A includes a pair of optical devices 41 (41L, 41R) and a frame part 42, and further includes a cover member 43 and a lens holder 44.

Of them, as shown in FIG. 14, the cover member 43 is a plate-like member that covers and protects the respective light guiding members 413 (413L, 413R) attached to the frame part 42 at the Z-direction side, and fixed to the frame part 42 with screws. A plurality of types of cover members 43 with different light transmission rates are prepared. For example, when the cover member 43 with a lower light transmission rate is attached, the outside world light does not reach the eyes, light and dark of the image to be visually recognized are distinguished, and the visual recognition of the image is improved. Further, for example, when the cover member 43 with a higher light transmission rate is attached, the visual recognition of the outside world via the light guiding members 413 and the cover member 43 is secured.

The lens holder 44 holds lenses for vision correction and is detachably attached to the frame part 42.

Placement of Light Guiding Members with Respect to Lines of Sight (Visual Direction)

Figure 17:
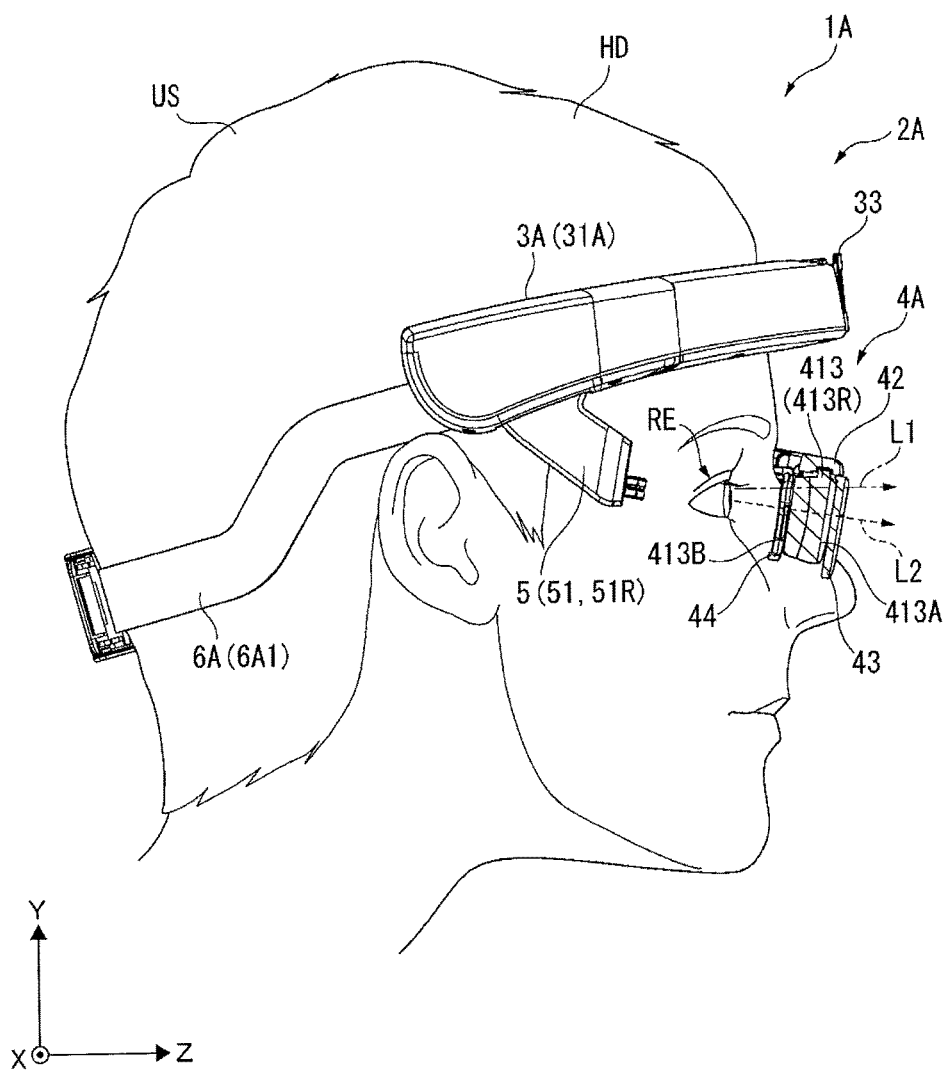
FIG. 17 is a partially sectional view showing a placement position of a light guiding member with respect to lines of sight in the second embodiment.

FIG. 17 is a partially sectional view showing a placement position of the light guiding member 413 (413R) with respect to lines of sight.

Each light guiding member 413 (413L, 413R) forming each optical device 41 is placed so that, when the observer US directs the line of sight in a predetermined direction, a virtual image surface reflected by the semi-transmissive layer of the light guiding member 413 and visually recognized may be nearly orthogonal to the line of sight. Specifically, suppose that the line of sight when the line of sight is directed along the Z-direction (when the axial direction of the head HD is along the vertical direction and the line of sight is along the horizontal direction) is L1, the light guiding member 413 is placed so that a surface 413A at the observer side and a surface 413B at the opposite side to the observer side in each light guiding member 413 may be nearly orthogonal to a line of sight L2 inclined downward to about 10° with respect to the line of sight L1. These respective surfaces 413A, 413B are nearly in parallel to each other and nearly in parallel to the virtual image surface. Accordingly, the light guiding member 413 is placed as described above, the virtual image surface of each light guiding member 413 is nearly orthogonal to the line of sight L2.

Generally, when an axial direction of a head HD is along the vertical direction, a human is more comfortable to direct the line of sight slightly downward than to direct the line of sight along the horizontal direction. Specifically, in the placement state of the head HD, when the line of sight is directed along the horizontal direction, it is necessary to apply more tension to the extraocular muscle for changing the line of sight than that when the line of sight is directed slightly below the horizontal direction, and fatigue of the extraocular muscle is easily caused. In other words, in the placement state of the head HD, when the line of sight is directed slightly below the horizontal direction, it is necessary to apply less tension to the extraocular muscle than that when the line of sight is directed along the horizontal direction, and fatigue is less caused. Accordingly, under a relaxed condition in a upright position, the line of sight is directed downward to nearly 10° with respect to the horizontal direction, and, under a relaxed condition in a seated position, the line of sight is directed downward to nearly 15° with respect to the horizontal direction.

On the other hand, the light guiding members 413 are placed as described above, and thereby, the image (virtual image) may be visually recognized under a relaxed condition in a upright position. Therefore, the fatigue when a predetermined operation is performed while the observer US wearing the virtual image display apparatus 1A observes the image in the upright position may be reduced. The line of sight as a reference when the light guiding member 413 is placed (reference line of sight), i.e., the angle of the line of sight orthogonal to the virtual image surface is not limited to the angle of the line of sight L2 with respect to the horizontal direction, but can be changed as appropriate. For example, the reference line of sight may be the line of sight directed downward to nearly 15° with respect to the horizontal direction, i.e., the line of sight under the relaxed condition in the seated position or an upward line of sight.

Note that the respective arms 51 supporting the display unit 4A are pivotally supported by the rotation shaft portions 35A located in the positions corresponding to the temples of the observer US in the headband part 3A in the first end portions 52, rotatable in the vertical directions around the rotation shaft portions 35A, and the display unit 4A is slidable in the vertical directions with respect to the arms 51 by the movement mechanisms AM. Accordingly, the position of the display unit 4A (particularly, the light guiding members 413) can be adjusted according to the directions of lines of sight and the positions of the eyes.

When the display unit 4A is slid in the vertical directions by the movement mechanisms AM, in a state in which the respective surfaces 413A, 413B nearly in parallel to the virtual image surfaces are orthogonal to the lines of sight L2, the display unit 4A is slid in the vertical directions while the state is maintained. Accordingly, the display unit 4A may be placed so that the lines of sight L2 may pass through the centers of the images (virtual images) visually recognized on the virtual image surfaces, and thereby, the images may be visually recognized more easily.

Adjustment of Angle of Convergence by Placement of Optical Devices

Figure 18:
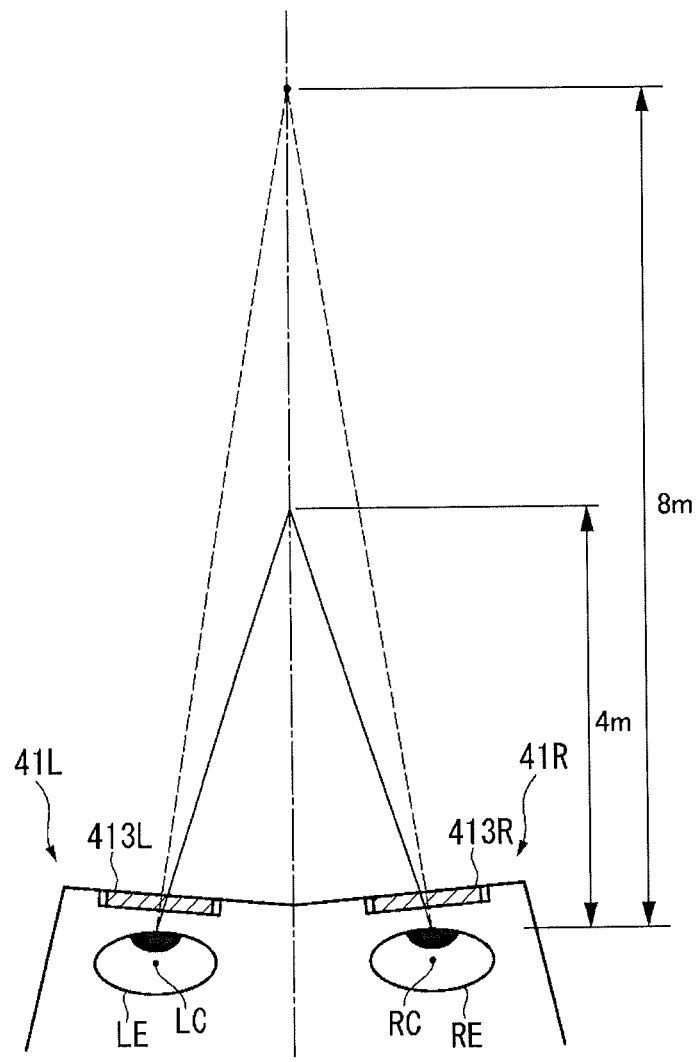
FIG. 18 is a schematic diagram showing a relationship between placement of light guiding members and a display distance in the second embodiment.

FIG. 18 is a schematic diagram showing a relationship between placement of the light guiding members 413 and a distance to an intersection point P of lines of sight of eyes (display distance).

Further, in the virtual image display apparatus 1A according to the embodiment, as shown in FIG. 18, the angle of convergence in design when the images are visually recognized is not set so that the intersection point P may be located at nearly eight meters ahead of the eyes LE, RE, but set so that the intersection point P may be located at nearly four meters ahead of the eyes LE, RE. That is, the position of the intersection point P set with respect to the virtual image display apparatus 1A is set in a position closer to the eyes LE, RE of the observer US than the position of the intersection point P set with respect to the virtual image display apparatus 1, and thereby, the angle of convergence in design with respect to the virtual image display apparatus 1A is wider than the angle of convergence in design with respect to the virtual image display apparatus 1.

Accordingly, in the virtual image display apparatus 1A, as seen from the Y-direction side, the optical device for left eye 41L including the light guiding member 413L is placed in a position rotated around the center LC of the left eye LE. Namely, the optical device for left eye 41L is placed in a position rotated around a virtual line along the axial direction of the head HD and passing through the center LC.

Specifically, compared to the placement position of the light guiding member 413L in the virtual image display apparatus 1, the light guiding member 413L in the virtual image display apparatus 1A is placed in a position in which the end of the optical device for left eye 41L at the optical unit 412 side in the light guiding member 413L is farther from the observer US and the end at the opposite side to the optical unit 412 (the end at the light guiding member 413R side) is closer to the observer US.

Similarly, in the virtual image display apparatus 1A, as seen from the Y-direction side, the optical device for right eye 41R including the light guiding member 413R is placed in a position rotated around the center RC of the right eye RE. Namely, the optical device for right eye 41R is placed in a position rotated around a virtual line along the axial direction of the head HD and passing through the center RC.

Specifically, compared to the placement position of the light guiding member 413R in the virtual image display apparatus 1, the light guiding member 413R in the virtual image display apparatus 1A is placed in a position in which the end of the optical device for right eye 41R at the optical unit 412 side in the light guiding member 413R is farther from the observer US and the end at the opposite side to the optical unit 412 (the end at the light guiding member 413L side) is closer to the observer US.

Note that, in the embodiment, it is assumed that the rotation angles of the optical devices 41L, 41R are angles at which the angle of convergence is changed by 1°, however, the rotation angles and the angle of convergence are not limited to those, but can be changed as appropriate.

When the light guiding members 413L, 413R are placed as described above, the respective virtual image surfaces of the light guiding members 413L, 413R are shifted to positions closer to the center between the left eye LE and the right eye RE. Accordingly, when trying to observe the images (virtual images) on the virtual image surfaces, the lines of sight of the observer US are directed inward and the position of the intersection point P is closer toward the observer US. Therefore, compared to the case by the virtual image display apparatus 1, the display distance of the virtual images may be made shorter and the virtual images may be displayed to be observed in the position closer to the observer.

Adjustment of Angle of Convergence by Adjustment of Center Positions of Images

Here, the angle of convergence may be adjusted by adjustment of the center positions of the images displayed on the light guiding members 413 (413L, 413R). Accordingly, the center positions of the images formed by the respective optical units 412 of the optical devices 41L, 41R are shifted in the horizontal directions when the images are visually recognized, and thereby, not only the angle of convergence but also the display distance of the visually recognized images (virtual images) may be adjusted.

Figure 19:
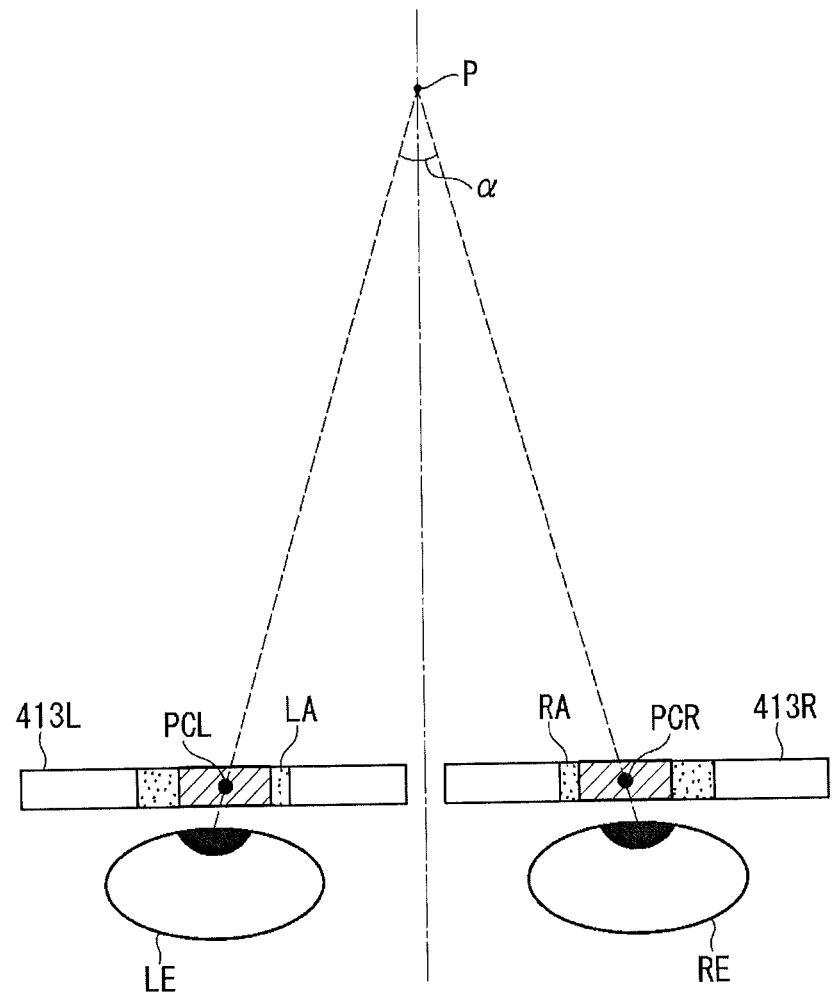
FIG. 19 is a schematic diagram showing a relationship between center positions of images and directions of lines of sight in the second embodiment.

FIG. 19 is a schematic diagram showing a relationship between the center positions of the images formed by the optical units 412 and displayed on the light guiding members 413 and the directions of the lines of sight. Note that, in FIG. 19, to facilitate understanding, the light guiding members 413 are orthogonal to the Z-direction, however, actually, the light guiding members 413 are inclined with respect to the Z-direction as described above.

For example, as shown in FIG. 19, when image lights with the maximum resolution are formed by the respective optical units 412 of the optical devices 41L, 41R and the image lights are guided to the left eye LE and the right eye RE of the observer US in the semi-transmissive layers of the light guiding members 413L, 413R, areas where images corresponding to the image lights can be visually recognized are referred to as visually recognized areas LA, RA. Further, the center positions of the images visually recognized in the visually recognized areas LA, RA are referred to as center positions PCL, PCR.

When these images are formed by the respective optical units 412 and the images are displayed via the light guiding members 413L, 413R, the line of sight of the left eye passes through the center position PCL and the line of sight of the right eye passes through the center position PCR. The angle of convergence in this case is an angle of convergence α.

Figure 20:
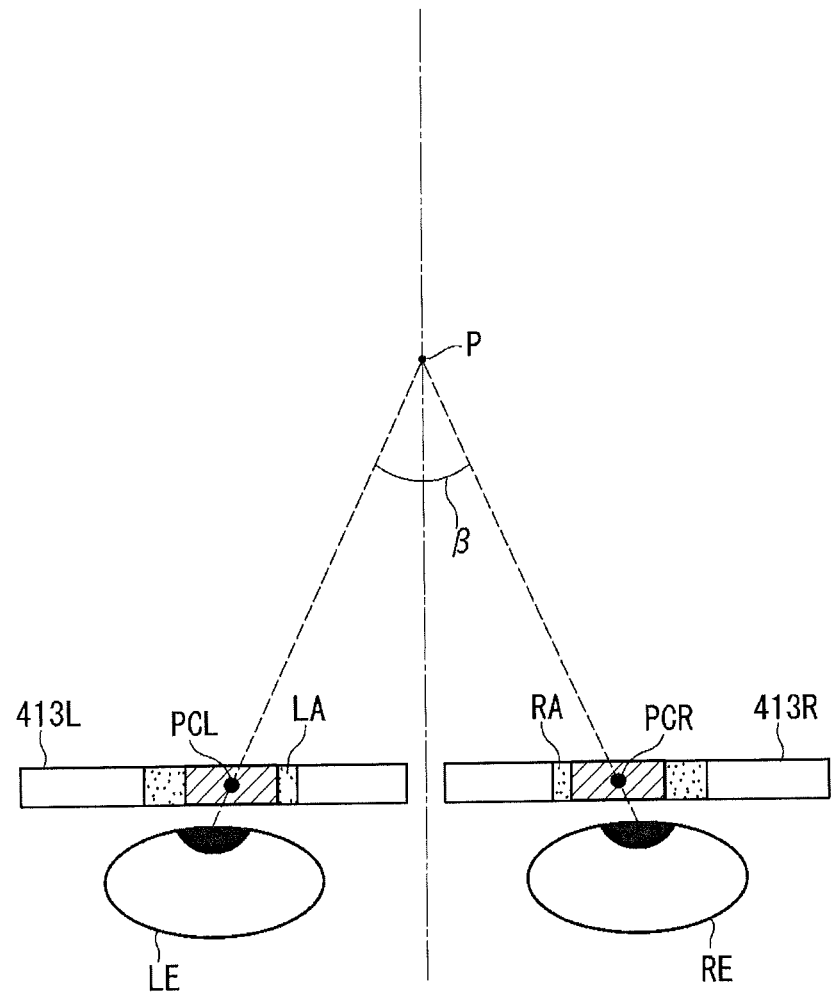
FIG. 20 is a schematic diagram showing a relationship between the center position of the image and the direction of the line of sight in the second embodiment.

FIG. 20 shows the center positions PCL, PCR when the center positions PCL, PCR are shifted from the positions shown in FIG. 19 in the directions closer to the other light guiding members 413 and the directions of the lines of sight.

When the center position PCL is shifted from the state shown in FIG. 19 toward the light guiding member 413R side (i.e., the right side, the X-direction side), the line of sight of the left eye passes through the shifted center position PCL as shown in FIG. 20. Similarly, when the center position PCR is shifted from the state shown in FIG. 19 toward the light guiding member 413L side (i.e., the left side, the opposite side to the X-direction side), the line of sight of the right eye passes through the shifted center position PCR as shown in FIG. 20.

The angle of convergence β in this case is larger than the angle of convergence α. That is, in the state shown in FIG. 20, compared to the state shown in FIG. 19, even when the images having the same resolution and the same size are displayed, for the observer US, the images are visually recognized as if they were displayed in the positions relatively closer to the observer US. When the center positions PCL, PCR are shifted in the opposite directions to those as described above, the angle of convergence becomes narrower, and, even when the images having the same resolution and the same size are displayed, for the observer US, the images are visually recognized as if they were displayed in the positions farther from the observer US.

As described above, the angle of convergence may be adjusted by adjustment of the formation positions of the images in the optical units 412, e.g., the formation positions of the displayed images in the image formation areas (shifting of the positions of the pixels forming the displayed images in the image formation areas), and thereby, the positions of the virtual image surfaces on which the observer US visually recognizes the images (display distance) may be adjusted. Therefore, for example, the images may be formed and displayed so that the display distance and the angle of convergence may fall within the range of comfortable parallax.

Note that, for example, the control unit 32 may control the optical units 412 to allow the optical units 412 to perform the above described image formation based on control signals input according to the input operation using a button CD1 of the control device CD. Or, the observer US or the like may input information of the display distance, the angle of convergence, or the like, the control device CD may output image information with adjusted center positions PCL, PCR of the images in the image formation areas of the optical units 412 based on the information, the control unit 32 and the optical devices 41L, 41R form and display images in response to the input image information, and thereby, the images with adjusted center positions may be displayed.

Advantages of Second Embodiment

According to the above described virtual image display apparatus 1A of the embodiment, the same advantages as those of the virtual image display apparatus 1 may be obtained, and further, the following advantages may be obtained.

Here, as described above, a human is more comfortable to direct the line of sight to the lower side than an orthogonal direction than to direct the line of sight to the upper side including the orthogonal direction (Z-direction) with respect to the axial direction of the head HD (Y-direction).

On the other hand, the display unit 4 is placed so that, when the head HD is seen along the direction orthogonal to the Y-direction and the Z-direction (X-direction), the virtual image surfaces on which the images are visually recognized may be nearly orthogonal to the lines of sight L2 as virtual lines inclined downward at a predetermined angle with respect to the Y-direction and the Z-direction.

According to the configuration, when the lines of sight are set along the lines of sight L2, the images displayed by the display unit 4 may be easily visually recognized. Therefore, the displayed images may be easily visually recognized in the directions of the lines of sight under a relatively relaxed condition.

Here, under a relaxed condition in an upright position, the lines of sight are directed downward to nearly 10° with respect to the horizontal direction. Accordingly, the virtual image surfaces are nearly orthogonal to the lines of sight L2 inclined downward to nearly 10° with respect to the Z-direction, and thereby, the observer US may visually recognize the images under the relaxed condition. Therefore, the displayed images may be visually recognized more easily.

The surfaces 413A at the observer side and the surfaces 413B at the opposite side to the observer in the light guiding members 413 (413L, 413R) are respectively in parallel to the virtual image surfaces, and the light guiding members 413 are placed so that the surfaces 413A, 413B may be nearly orthogonal to the lines of sight L2. According to the configuration, the light guiding members 413 are placed with respect to the lines of sight L2 with reference to ones of the surfaces 413A, 413B, and thereby, the virtual image surfaces may be located to be nearly orthogonal to the lines of sight L2. Therefore, the light guiding members 413 may be easily placed in the positions in which the images are easily visually recognized.

Modifications of Embodiments

The invention is not limited to the above described embodiments, and the invention includes modifications, improvements, etc. within the range in which the purpose of the invention may be achieved.

In the above described respective embodiments, the configuration in which the supporting part 5 includes the pair of arms 51 and the pair of arms 51 support the display unit 4, 4A from both sides in the X-direction is exemplified. However, the invention is not limited to that. For example, the supporting part 5 may include only one arm 51. In this case, the arm 51 may be connected to a part near the center of the display unit 4, 4A in the X-direction, or connected to one end side in the X-direction. In the configuration, the number of parts forming the virtual image display apparatus 1, 1A may be reduced and the weight may be reduced. Note that, in the configuration in which the pair of arms 51 support the display unit 4, 4A from both sides in the X-direction, the display unit 4, 4A may be supported more stably than that supporting the unit at one point.

In the above described respective embodiments, the configuration in which the display unit 4, 4A includes the optical device for left eye 41L and the optical device for right eye 41R, and the pair of optical devices 41 are integrally fixed by the frame part 42 and integrally rotated by the respective arms 51 is exemplified. However, the invention is not limited to that. For example, the respective optical devices 41 may be individually supported by the corresponding arms 51. Specifically, the optical device for right eye 41R may be supported by the arm 51R on the right side from the observer and the optical device for left eye 41L may be supported by the arm 51L on the left side from the observer, respectively, individually and rotatably.

In the above described respective embodiments, the configuration in which the display unit 4, 4A includes the optical device for left eye 41L and the optical device for right eye 41R is exemplified. However, the invention is not limited to that. Namely, a configuration including only one of the optical device for left eye 41L and the optical device for right eye 41R may be employed. In this case, a configuration in which the display unit 4, 4A is supported by one arm 51, e.g. a configuration in which the optical device for left eye 41L is supported by only the left arm 51L or by the pair of arms 51 may be employed.

In the above described respective embodiments, the arms 51 are adapted to be rotatable around the rotation shafts R2, R3 in parallel to the X-direction nearly orthogonal to the visual direction of the visual recognition by the observer (the direction in which the eyes LE, RE are arranged). However, the invention is not limited to that. Namely, various configurations rotatable around the connecting portions to the headband part 3, 3A may be employed.

For example, in a configuration in which the display unit 4, 4A supported by one arm 51 and in the above described configuration in which the optical device for left eye 41L is supported by the left arm 51L and the optical device for right eye 41R is supported by the right arm 51R individually, the arms may be rotatable around the rotation shafts in parallel to the Y-direction.

Further, for example, the arms 51 may be rotatable around the rotation shafts contained in the XZ-plane and intersecting with the visual direction of the observer US.

In the above described respective embodiments, the headband part 3, 3A (main body case 31, 31A) as the main body part is formed in the nearly semicircular shape (nearly U-shape) along the shape of the head HD of the observer US as seen from the Y-direction side. However, the invention is not limited to that. Namely, as long as the headband part 3, 3A (main body case 31, 31A) may be adapted to be placed along the head HD of the observer US (the part along the circumferential direction around the center axis of the head HD and upper than the line passing through the eyes), e.g., a configuration having an arc-shaped inner surface along the head HD at least in a part may be employed. Or, for example, a configuration in which the part corresponding to the forehead part and the parts corresponding to the temporal parts are nearly orthogonal to each other may be employed. As described above, as long as the headband part 3, 3A (main body case 31, 31A) may be placed along the head by the attachment member 6, 6A, its outer shape is not particularly limited.

Further, the virtual image display apparatus 1, 1A has the attachment member 6 (band 61), 6A (attachment belt 6A1) as the fixing part that fixes the headband part 3, 3A to the head HD. However, the invention is not limited to that. Namely, the fixing part may have any configuration as long as the frame (headband part, main body part) may be fixed to the position in which the images displayed by the display unit connected to the frame via the supporting part may be visually recognized by the observer US. For example, the fixing part may have a shape and a configuration that cover at least a part of the head HD of the observer US (specifically, the upper part of the head HD) like a cap or a hard hat.

Specifically, as the configuration of the fixing part, a configuration of a head cap-type that is attached to cover the fixed part, a crossed band-type with bands along the fixed part crossed on the top of the head, a belt-type provided to surround the fixed part may be employed. Further, the fixing part may include two or more contact members in contact from the front-to-back direction or the left-to-right direction of the observer US to sandwich the fixed part and a supporting part that supports the contact members. Further, the attachment member may be a string-shaped member having a circular or rectangular cylindrical shape in the sectional view, and may have a flat surface as a surface opposed to the head and arc-like curved surfaces as the other surfaces.

In the above described respective embodiments, the configuration in which the arms 51 are rotatable around the connecting portion to the headband part 3, 3A and the position of the display unit 4, 4A is adjustable is exemplified. However, the invention is not limited to that. For example, a configuration in which the supporting part 5 includes a movable portion and the position of the display unit 4, 4A is adjustable may be employed. Or, a configuration in which the supporting part 5 is not rotatable, but fixed with respect to the headband part 3, 3A and does not include any movable portion, i.e., a configuration in which the position and the angle of the display unit 4, 4A are fixed with respect to the headband part 3, 3A may be employed.

In the above described respective embodiments, as the movement mechanism AM, the configuration including the guide rail 4111 provided at the display unit 4, 4A side and the sliding member 54 provided at the arm 51 side is exemplified. However, the invention is not limited to that. Namely, the guide rail may be provided at the arm 51 side and the sliding member may be provided at the display unit 4, 4A side.

Further, the movement mechanism AM is not limited to the configuration in which the sliding member 54 slidably supports the guide rail 4111, but may be a movement mechanism that can move the display unit 4, 4A closer to or away from the headband part 3, 3A by moving one of the display unit 4, 4A and the arm 51 relative to the other. For example, the arm 51 connected to the display unit 4, 4A may be movable along the Y-direction with respect to the headband part 3, 3A as the main body part.

In the above described respective embodiments, the imaging unit 33 is rotated around the rotation shaft R1 in parallel to the X-direction, and thereby, the imaging direction can be adjusted within the YZ-plane, i.e., in the vertical directions in FIG. 1. However, the invention is not limited to that. Namely, the imaging direction can be adjusted in another direction than the vertical direction, e.g., the horizontal direction or the imaging direction can be adjusted in the vertical direction and the horizontal direction. Or, the imaging direction of the imaging unit 33 may be fixed. Or, the imaging unit 33 is not necessarily provided.

In the above described respective embodiments, the light guiding members 413L, 413R are respectively fixed. However, the invention is not limited to that. For example, the light guiding members 413L, 413R may be adapted to be rotatable to the opposite side to the observer US independently or in conjunction with each other around rotation shafts along the X-direction. In this case, the rotation shafts are located at the Y-direction side or the opposite side to the Y-direction side in the light guiding members 413, and thereby, the light guiding members 413 may be rotated to be removed from the visual direction of the observer US.

In the above described respective embodiments, the configuration in which the control unit 32 is provided in the headband part 3, 3A is exemplified. However, the invention is not limited to that. For example, the control unit 32 may be provided in the display unit 4, 4A or the supporting part 5 (arm 51).

In the above described respective embodiments, the configuration in which the cable CB is routed inside of the headband part 3, 3A and the cables CR are routed inside of the arms 51, then, routed inside of the headband part 3, 3A, and connected to the control unit 32 is exemplified. However, the invention is not limited to that. For example, the cables CB, CR may be routed outside of the headband part 3, 3A and the arms 51.

In the above described respective embodiments, the virtual image display apparatus 1, 1A is connected to the controller or the control device CD that receives various input operations by the observer US, and the control unit 32 controls the virtual image display apparatus 1, 1A in response to the input from the controller and the control device CD. However, the invention is not limited to that.

For example, in a configuration in which an external device including the controller and the control device CD is connected, one of the virtual image display apparatus 1, 1A (image display apparatus) and the external device has at least one of a function of acquiring operation information in response to the operation by the observer, a function of acquiring image information and driving the display unit 4, 4A according to the image information, and a function of supplying power, and the other has the other functions.

Further, the virtual image display apparatus 1, 1A (image display apparatus) may be connected to an image supply apparatus (PC or the like) via the external device, or directly connected to the image supply apparatus not via the external device. In the configuration, the virtual image display apparatus 1, 1A is used as an image display unit in the image supply apparatus and various operations of the virtual image display apparatus 1, 1A may be controlled by the image supply apparatus. Note that, in this case, the image supply apparatus may supply power for driving the virtual image display apparatus 1, 1A.

Or, a battery and a control device such as an image processing device may be provided in the virtual image display apparatus 1, 1A (e.g. the headband part 3, 3A or display unit 4, 4A), and further, a slot for a memory card or the like may be provided. In contrast, the control unit that controls part of the functions of the virtual image display apparatus is not necessarily provided in the headband part 3, 3A. Further, an operation part that receives input operations by the observer US may be provided in the virtual image display apparatus 1, 1A, or a configuration that can detect tap operation may be provided. Namely, the controller and the control device CD are not necessarily provided.

In the above described first embodiment, the angle of convergence of the virtual image display apparatus 1 in design when the images are visually recognized is set so that the intersection point P may be located at nearly eight meters ahead of the eyes LE, RE. Further, in the above described second embodiment, the angle of convergence of the virtual image display apparatus 1A in design is set so that the intersection point P may be located at nearly four meters ahead of the eyes LE, RE. However, the invention is not limited to that. Namely, the angle of convergence in design can be changed as appropriate and the distance between the intersection point P and the eyes LE, RE is not limited to eight meters and four meters, but can be changed as appropriate.

In the above described respective embodiments, as the image display apparatus, the see-through virtual image display apparatus 1, 1A is exemplified. However, the invention is not limited to that. Namely, the invention may be applied to a non-transmissive virtual image display apparatus without observation of the outside world and a video see-through virtual image display apparatus that displays captured images by an imaging sensing device that images the outside world.

In the above described respective embodiments, as the image display apparatus, the virtual image display apparatus 1, 1A that displays images visually recognized as virtual images by the observer US is exemplified. However, the invention is not limited to that. The invention may be applied to any apparatus that allows the observer to visually recognize images. For example, a configuration in which display means such as a liquid crystal panel or an organic EL (Electro-Luminescence) panel is provided in the position corresponding to the eyes of the observer may be employed.

Further, the invention may be applied to a laser retinal projection type HMD. For example, the invention may be applied to an HMD having the display unit including a laser light source and an optical system that guides the laser light source to eyes of the observer, and allowing a user to visually recognize images by allowing the laser beam to enter the eyes of the user and scanning the retinas, and forming images on the retinas.

The entire disclosure of Japanese Patent Application No. 2014-236701, filed Nov. 21, 2014 and 2015-123641, filed Jun. 19, 2015 are expressly incorporated by reference herein.

What is claimed is:

1. An image display apparatus comprising:
a frame along a head of an observer;
a display unit that displays an image that can be visually recognized by the observer, wherein the display unit slides in a vertical direction; and
a supporting part attached to the frame and supporting the display unit, wherein the supporting part maintains a position and is configured to not move relative to the head of the observer when the display unit slides in the vertical direction,
wherein the frame is fixed to a position in which the image displayed by the display unit connected to the frame via the supporting part is visually recognized by the observer.

2. The image display apparatus according to claim 1, wherein the supporting part is adapted to be rotatable around a connecting portion to the frame.

3. The image display apparatus according to claim 2, wherein the supporting part is connected to the frame rotatably around a rotation shaft nearly orthogonal to a visual direction when the observer visually recognizes the image.

4. The image display apparatus according to claim 2, wherein the display unit is placed in a position corresponding to an eye of the observer, and
the supporting part connects a position corresponding to a temple of the observer in the frame and the display unit.

5. The image display apparatus according to claim 1, wherein the supporting part has a plurality of arms with one ends respectively connected to a portion at one end and a part at the other end of the frame in horizontal directions for the observer and the other ends connected to the display unit.

6. The image display apparatus according to claim 1, further comprising a movement mechanism that allows the display unit to be movable in directions closer to or away from the frame.

7. The image display apparatus according to claim 1, further comprising an imaging unit provided in the frame and imaging at least a partial region in a field of view of the observer.

8. The image display apparatus according to claim 7, wherein the frame has an adjustment mechanism that adjusts an imaging direction of the imaging unit.

9. The image display apparatus according to claim 1, further comprising a control circuit provided within the frame, wherein the control circuit controls at least part of functions of the image display apparatus.

10. The image display apparatus according to claim 1, further comprising a cable extending from the display unit and passing through the supporting part and the frame.

11. The image display apparatus according to claim 1, wherein the frame has an arc-like outer shape along the head of the observer.

12. The image display apparatus according to claim 1, wherein the display unit has a display part for left eye and a display part for right eye for visual recognition of the image in each of a left eye and a right eye of the observer.

13. The image display apparatus according to claim 1, wherein the display unit has a light guiding member that guides a light forming the image to the eye of the observer and transmits outside light.

14. The image display apparatus according to claim 1, wherein, when the head is seen along a direction orthogonal to an axial direction of the head and a front-to-back direction of the head, the display unit can be placed so that a display surface on which the image is visually recognized may be nearly orthogonal to a line of sight inclined to a predetermined angle with respect to the axial direction and the front-to-back direction.

15. The image display apparatus according to claim 14, wherein the line of sight is inclined downward to nearly 10° with respect to the front-to-back direction.

16. The image display apparatus according to claim 14, wherein the display unit has a light guiding member that guides a light forming the image to the eye of the observer and transmits outside light,
a surface at the observer side and a surface at an opposite side to the observer in the light guiding member are respectively nearly in parallel to the display surface, and
the surface at the observer side and the surface at the opposite side are respectively nearly orthogonal to the line of sight.

17. The image display apparatus according to claim 1, further comprising a fixing part that fixes the frame in a position in which the image is visually recognized by the observer.

18. An image display apparatus comprising:
a frame along a head of an observer;
a display unit that displays an image that can be visually recognized by the observer, wherein the display unit slides in a vertical direction; and
a supporting part that supports the display unit and is adapted to be rotatable around a connecting portion to the frame, and can adjust a position of the display unit so that a display surface on which the image is visually recognized may be nearly orthogonal to a line of sight of the observer,
wherein the supporting part maintains a position and is configured to not move relative to the head of the observer when the display unit slides in the vertical direction.

* * * * *